US009807667B2

(12) United States Patent
Huang et al.

(10) Patent No.: US 9,807,667 B2
(45) Date of Patent: Oct. 31, 2017

(54) METHOD FOR RELOCATING GATEWAY, MOBILE MANAGEMENT ENTITY AND HOST BASE STATION

(71) Applicant: ZTE CORPORATION, Shenzhen, Guangdong Province (CN)

(72) Inventors: Ying Huang, Shenzhen (CN); Yin Gao, Shenzhen (CN); Li Chu, Shenzhen (CN); Shuang Liang, Shenzhen (CN); Feng Xie, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 77 days.

(21) Appl. No.: 14/646,492

(22) PCT Filed: Oct. 9, 2013

(86) PCT No.: PCT/CN2013/001215
§ 371 (c)(1),
(2) Date: May 21, 2015

(87) PCT Pub. No.: WO2014/079141
PCT Pub. Date: May 30, 2014

(65) Prior Publication Data
US 2015/0312832 A1    Oct. 29, 2015

(30) Foreign Application Priority Data

Nov. 21, 2012  (CN) .......................... 2012 1 0475631

(51) Int. Cl.
*H04W 36/32* (2009.01)
*H04W 64/00* (2009.01)
(Continued)

(52) U.S. Cl.
CPC ....... *H04W 36/32* (2013.01); *H04W 36/0055* (2013.01); *H04W 64/006* (2013.01);
(Continued)

(58) Field of Classification Search
CPC ...... H04W 80/04; H04W 36/18; H04W 36/14
See application file for complete search history.

(56) References Cited

U.S. PATENT DOCUMENTS

2012/0155377 A1\*  6/2012  Chai ................. H04W 36/0083
                                                    370/315
2014/0036776 A1\*  2/2014  Al-Shalash ........... H04W 40/22
                                                    370/328
2015/0065112 A1\*  3/2015  Lee ....................... H04W 24/02
                                                    455/418

FOREIGN PATENT DOCUMENTS

CN      101651950 A      2/2010
CN      102892155 A      1/2013
(Continued)

OTHER PUBLICATIONS

3rd Generation Partnership Project; Technical Specification Group Radio Access Network; Mobile Relay for Evolved Universal Terrestrial Radio Access (E-UTRA)(LTE-Advanced); (Release 12); 3GPP TR 36.836 V2.0.1 (Oct. 2012).
(Continued)

*Primary Examiner* — Andrew Lai
*Assistant Examiner* — Zhiren Qin
(74) *Attorney, Agent, or Firm* — Ling Wu; Stephen Yang; Ling and Yang Intellectual Property

(57) ABSTRACT

A method for gateway relocation, an MME and a DeNB are disclosed. The method includes: in a process of an MRN performing handover of the DeNB, the MME of the MRN
(Continued)

judging whether it is required to execute a relocation of a gateway serving the MRN according to the current location of the MRN.

13 Claims, 9 Drawing Sheets

(51) Int. Cl.
| | |
|---|---|
| *H04W 88/16* | (2009.01) |
| *H04W 36/00* | (2009.01) |
| *H04W 36/12* | (2009.01) |
| *H04W 84/04* | (2009.01) |
| *H04W 84/00* | (2009.01) |

(52) U.S. Cl.
CPC ............ *H04W 88/16* (2013.01); *H04W 36/12* (2013.01); *H04W 84/005* (2013.01); *H04W 84/047* (2013.01)

(56) References Cited

FOREIGN PATENT DOCUMENTS

| WO | WO2008020788 A1 | 2/2008 |
| WO | WO2011100892 A1 | 8/2011 |
| WO | 2014019554 A1 | 2/2014 |

OTHER PUBLICATIONS

Consideration on Mobile Relay architecture; New Postcom; 3GPP TSG RAN WG3 Meeing#75bis; Mar. 26-30, 2012; San Joes del Cabo, Mexico; R3-120635.

Mobile Relay PGW Relocation for Path Optimization; Huawei; 3GPP TSG RAN WG3 #77 meeting; Qingdao, China, Aug. 13-17, 2012. R3-121656.

\* cited by examiner

METHOD FOR RELOCATING GATEWAY, MOBILE MANAGEMENT ENTITY AND HOST BASE STATION

TECHNICAL FIELD

The present document relates to the field of wireless communication technology, and particularly, to a method for gateway relocation, a Mobility Management Entity (MME) and a donor base station.

BACKGROUND OF THE RELATED ART

In the Wireless Relay technology in the Long Term Evolution-Advanced (LTE-A) standard issued by the 3rd Generation Partnership Project (3GPP) standard organization, a Relay Node (RN) provides to a User Equipment (UE) accessing a cell of the relay node functions and services which are similar to those of a common evolved Node B (eNB), and then accesses an eNB (called a Donor eNB (DeNB)) serving the relay node via a wireless interface in a manner similar to a common UE. As the high speed railway is massively constructed and put into operation, the demand for communications on the train is increasing constantly. However, since the high-speed moving train is influenced by Doppler frequency shift, cell frequent handover and great penetration loss of high-speed rail carriage and so on, coverage of the existing network base stations is hard to meet communication quality requirements of the high-speed rail. Therefore, the industry proposes to deploy a relay node on the high-speed rail, and this relay node is generally called as a Mobile Relay Node (MRN). As shown in FIG. 1 and FIG. 2, by the mobile relay technology, users (a UE1 and a UE2) on the high-speed rail train can communicate with a relatively resting MRN, and the MRN can be switched among various DeNBs in the process of the high-speed rail moving, thereby avoiding simultaneous handover of a large number of users in the high-speed rail carriage and guaranteeing the communication quality between the UE and the MRN. Moreover, a series of problems existing on the high-speed rail can be better solved by enhancing a backbone connection between the MRN and the DeNB.

A mobile relay system can adopt an architecture shown in FIG. 1 (i.e., an architecture which is the same as the standardized R10 fix relay and generally called as architecture 2). In this architecture, a Service Gateway (S-GW), a Packet Data Network Gateway (P-GW) and a relay Gateway (relay GW) which serve the MRN are built in the DeNB, wherein the relay GW in the DeNB provides S1 and/or X2 agent functions for user plane data and control plane signaling of the UE. In this architecture, the S-GW, P-GW and relay GW (collectively called as GW) of the MRN are located in an initial DeNB which is assessed by the MRN when the MRN attaching. When the MRN on the high-speed rail moves far away from the initial DeNB, after the data of the UE reach the P-GW of the MRN, the data of the UE can reach the DeNB serving the MRN through forwarding and routing of multiple DeNBs, that is, there exists a problem that the routing path is too long, thereby causing delay increase of the data of the UE. Therefore, a routing optimization scheme can be considered, for example, when the MRN moves far away from the initial DeNB, during handover of the MRN the GW of the MRN is changed to be the built-in gateway in a DeNB which serves the MRN. As shown in FIG. 2, before the handover of the MRN, the GW of the MRN is located on DeNB1, and when a base station function of DeNB3 provides services for the MRN, the data of the UE firstly reach the GW function of the DeNB1, and then route to the base station function of the DeNB3 via DeNB2; the MRN can relocate its GW to the GW built in DeNB4 in the handover process, so that the data of the UE can directly reach the GW in the DeNB4, which shortens the path length and reduces the data delay. Since it is not required to execute the gateway relocation in each handover of the MRN, it is only required when the routing path is comparatively long. Moreover, in the architecture 2, due to the S1 and X2 agent functions of the DeNB, a target DeNB is required to meet a certain condition, and the gateway of the MRN can be relocated to the S-GW and P-GW built in the target DeNB. In a word, it is required to solve a problem of how to judge whether to execute the gateway relocation in the process of the current handover of the MRN.

The mobile relay system also can use an architecture shown in FIG. 3 (generally called as an architecture 1), there is no relay GW function entity in this architecture, the S-GW and P-GW providing services for the MRN are located in a core network, the DeNB encapsulates the user plane data and control plane signaling of the UE into a General Packet Radio Service (GPRS) Tunneling Protocol for Userplane (GTP-U) data packet and sends to the S-GW and P-GW of the MRN through a bearer of the mobile relay, and then routes the GTP-U data packet to an MME or S-GW of the UE through an Internet Protocol (IP). With the high-speed movement of the train, when the GW serving the MRN and located in the core network is far away from the MRN, there also exists the above problem that the routing path is too long. It can also consider to relocate the GW of the MRN to an S-GW and P-GW close to a DeNB serving the MRN currently in the process of the handover of the MRN. Similar to the description in the architecture 2, it is also required to solve the problem of how to judge whether to execute the gateway relocation in the process of the current handover of the MRN.

SUMMARY OF THE INVENTION

The embodiments of the present document provide a method for gateway relocation, a mobility management entity and a donor evolved Node B, which can determine whether to relocate a serving gateway for a mobile relay node when handover of a donor evolved Node B is performed to the mobile relay node.

The embodiment of the present document provides a method for gateway relocation, which comprises:

in a process of a mobile relay node, MRN, performing handover of a donor evolved Node B, DeNB, a mobility management entity, MME, of the MRN judging whether it is required to execute a relocation of a gateway serving the MRN according to a current location of the MRN.

Alternatively, the MME of the MRN judging whether it is required to execute the relocation of the gateway serving the MRN according to the current location of the MRN comprises:

the MME judging whether it is required to execute the relocation of the gateway serving the MRN according to a distance between the MRN and the gateway serving the MRN, and judging that it is required to execute the relocation of the gateway serving the MRN when the distance between the MRN and the gateway serving the MRN is greater than a gateway relocation distance threshold value.

Alternatively, the MME judging whether it is required to execute the relocation of the gateway serving the MRN according to the distance between the MRN and the gateway serving the MRN comprises:

the MME obtaining the current location of the MRN according to a tracking area code and/or a cell identifier of a cell in a DeNB in which the MRN is located currently;

the MME obtaining a location of the gateway serving the MRN according to saved location related information of the gateway serving the MRN; and according to the current location of the MRN and the location of the gateway serving the MRN, the MME determining the distance between the MRN and the gateway serving the MRN, and judging whether it is required to execute the relocation of the gateway serving the MRN.

Alternatively, in a system architecture that the gateway serving the MRN is built in a DeNB, the location related information of the gateway serving the MRN is a tracking area code and/or a cell identifier of a cell serving the MRN in the DeNB in which the gateway serving the MRN is located when the MRN accesses the DeNB in which the gateway serving the MRN is located.

Alternatively, the method further comprises:

the MME determining to execute the relocation of the gateway serving the MRN after judging that it is required to execute the relocation of the gateway serving the MRN.

Alternatively, the method further comprises:

in a system architecture that the gateway serving the MRN is built in a DeNB, the MME judging whether a target DeNB of the MRN meets a gateway relocation condition after the MME judges that it is required to execute the relocation of the gateway serving the MRN, if the target DeNB of the MRN meets the gateway relocation condition, the MME determining to execute the relocation of the gateway serving the MRN; and if the target DeNB of the MRN does not meet the gateway relocation condition, the MME determining not to execute the relocation of the gateway serving the MRN;

in an architecture that the gateway serving the MRN is located in a core network, the MME determining to execute the relocation of the gateway serving the MRN after judging that it is required to execute the relocation of the gateway serving the MRN.

Alternatively, the method further comprises:

the MME executing relocation of the gateway serving the MRN after determining to execute the relocation of the gateway serving the MRN, wherein, the relocation comprises a relocation of a packet data network gateway, P-GW, and/or a service gateway, S-GW, serving the MRN; and transferring a packet data network, PDN, connection of the MRN to the relocated gateway.

Alternatively, the MME judging whether the target DeNB of the MRN meets the gateway relocation condition comprises:

the MME judging whether a tracking area supported by the target DeNB contains a tracking area supported by the MRN; or, the MME judging whether a tracking area supported by the target DeNB contains a tracking area supported by a DeNB in which a gateway currently serving the MRN is located.

Alternatively, the MME judging whether the target DeNB of the MRN meets the gateway relocation condition comprises:

the MME judging whether a public land mobile network, PLMN, in which the target DeNB is located contains a PLMN in which the MRN is located; or, the MME judging whether a PLMN in which the target DeNB is located contains a PLMN in which the DeNB in which the gateway currently serving the MRN is located is located.

The embodiment of the present document further provides a method for gateway relocation, which comprises:

in a process of a mobile relay node, MRN, performing handover of a donor evolved Node B, DeNB, a mobility management entity, MME, of the MRN receiving relocation judgment indication information, and judging whether it is required to execute a relocation of a gateway serving the MRN according to the relocation judgment indication information;

wherein, the relocation judgment indication information is sent to the MME after a source DeNB or a target DeNB of the MRN judges whether it is required to execute the relocation of the gateway serving the MRN according to relocation judgment auxiliary information; or the relocation judgment indication information is sent to the MME after a target DeNB of the MRN judges whether it is required to execute the relocation of the gateway serving the MRN according to configuration information.

Alternatively, the relocation judgment auxiliary information comprises: counting information used for counting times of handover occurrence in the MRN after the last gateway relocation occurs; or, indication information in a history accessing cell list of the MRN and used for marking a source cell or a target cell when the gateway relocation occurs in the MRN; or, identification information of a source cell or a target cell when the gateway relocation occurs in the MRN; or, history accessing cell record information of the MRN after the last gateway relocation occurs.

Alternatively, the source DeNB or the target DeNB of the MRN judging whether it is required to execute the relocation of the gateway serving the MRN according to the relocation judgment auxiliary information comprises:

the source DeNB or the target DeNB, according to the relocation judgment auxiliary information, determining the number of cells which the MRN accesses after the last relocation of the gateway serving the MRN; and the source DeNB or the target DeNB judging whether the number of cells which the MRN accesses after the last relocation of the gateway serving the MRN reaches an accessing cell number threshold value, and if the number of cells which the MRN accesses after the last relocation of the gateway serving the MRN reaches the accessing cell number threshold value, judging that it is required to execute the relocation of the gateway serving the MRN.

Alternatively, the method further comprises:

in a system architecture that the gateway serving the MRN is built in the DeNB, if the source DeNB or the target DeNB judges that it is required to execute the relocation of the gateway serving the MRN, the target DeNB taking address information of the gateway serving the MRN built in the target DeNB as the relocation judgment indication information to send to the MME; and the MME determining that it is required to execute the relocation of the gateway serving the MRN after receiving the address information of the gateway serving the MRN.

Alternatively, the method further comprises:

the MME determining to execute the relocation of the gateway serving the MRN after judging that it is required to execute the relocation of the gateway serving the MRN.

Alternatively, the method further comprises:

the MME judging whether the target DeNB of the MRN meets a gateway relocation condition, if the target DeNB of the MRN meets the gateway relocation condition, the MME determining to execute the relocation of the gateway serving the MRN after the MME judges that it is required to execute the relocation of the gateway serving the MRN, when the gateway serving the MRN is built in the target DeNB of the MRN; and if the target DeNB of the MRN does not meet the gateway relocation condition, the MME determining not to execute the relocation of the gateway serving the MRN; and in an architecture that the gateway serving the MRN is located in a core network, the MME determining to execute the relocation of the gateway serving the MRN after judging that it is required to execute the relocation of the gateway serving the MRN.

Alternatively, the method further comprises:

the MME executing relocation of the gateway serving the MRN after determining to execute the relocation of the gateway serving the MRN, wherein, the relocation at least comprises a relocation of a packet data network gateway, P-GW, and/or a service gateway, S-GW, serving the MRN; and transferring a packet data network, PDN, connection of the MRN to the relocated gateway.

Alternatively, the relocation judgment auxiliary information is saved and maintained by a DeNB which saves context information of the MRN; when the handover occurs in the MRN, the relocation judgment auxiliary information is sent by the source DeNB to the target DeNB.

Alternatively, the method further comprises:

when the relocation judgment auxiliary information contains the counting information, the source DeNB or the target DeNB clearing the counting information after executing the relocation of the gateway serving the MRN in the current handover process, wherein, the counting information is obtained by the source DeNB or the target DeNB of the MRN adding 1 to the counting information every time the handover process of the MRN occurs without executing the relocation of the gateway serving the MRN;

when the relocation judgment auxiliary information contains the indication information, the source DeNB or the target DeNB adding the indication information into an item of the source cell or the target cell corresponding to the current handover in the history accessing cell list of the MRN;

when the relocation judgment auxiliary information contains the identification information, the source DeNB or the target DeNB setting identification information of the source cell or the target cell corresponding to the current handover as the relocation judgment auxiliary information; and when the relocation judgment auxiliary information contains the history accessing cell record information of the MRN after the last gateway relocation occurs, the source DeNB or the target DeNB clearing the history accessing cell record information.

Alternatively, the MME judging whether it is required to execute the relocation of the gateway serving the MRN according to the relocation judgment indication information comprises:

in a case that the relocation judgment indication information is explicit indication information, the MME judging that it is required to execute the relocation of the gateway serving the MRN when the relocation judgment indication information indicates that it is required to execute the relocation; and the MME judging that it is not required to execute the relocation of the gateway serving the MRN when the MME does not receive the relocation judgment indication information or the relocation judgment indication information indicates that it is not required to execute the relocation; or, in a case that the relocation judgment indication information is implicit indication information and the relocation judgment indication information is implicitly indicated using an address of the gateway serving the MRN, the MME judging that it is required to execute the relocation of the gateway serving the MRN when the MME receives the address; and the MME judging that it is not required to execute the relocation of the gateway serving the MRN when the MME does not receive the address.

The embodiment of the present document further provides a mobility management entity, which comprises: a location determination unit and a first judgment unit, wherein:

the location determination unit is configured to: in a process of a mobile relay node, MRN, performing handover of a donor evolved Node B, DeNB, determine a current location of the MRN; and the first judgment unit is configured to: judge whether it is required to execute a relocation of a gateway serving the MRN according to the current location of the MRN.

Alternatively, the first judgment unit is configured to judge whether it is required to execute the relocation of the gateway serving the MRN according to the current location of the MRN in the following way:

judging whether it is required to execute the relocation of the gateway serving the MRN according to a distance between the MRN and the gateway serving the MRN, and judging that it is required to execute the relocation of the gateway serving the MRN when the distance between the MRN and the gateway serving the MRN is greater than a gateway relocation distance threshold value.

Alternatively, the location determination unit is configured to determine the current location of the MRN in the following way: obtaining the current location of the MRN according to a tracking area code and/or a cell identifier of a cell in a DeNB in which the MRN is located currently;

the location determination unit is further configured to: obtain a location of the gateway serving the MRN according to saved location related information of the gateway serving the MRN; and the first judgment unit is configured to judge whether it is required to execute the relocation of the gateway serving the MRN according to the distance between the MRN and the gateway serving the MRN in the following way: according to the current location of the MRN and the location of the gateway serving the MRN, determining the distance between the MRN and the gateway serving the MRN, and judging whether it is required to execute the relocation of the gateway serving the MRN.

Alternatively, the mobility management entity further comprises: a second judgment unit, wherein:

the second judgment unit is configured to: after the first judgment unit judges that it is required to execute the relocation of the gateway serving the MRN, in a system architecture that the gateway serving the MRN is built in a DeNB, judge whether a target DeNB of the MRN meets a gateway relocation condition, if the target DeNB of the MRN meets the gateway relocation condition, determine to execute the relocation of the gateway serving the MRN; and if the target DeNB of the MRN does not meet the gateway relocation condition, determine not to execute the relocation of the gateway serving the MRN.

Alternatively, the second judgment unit is configured to judge whether the target DeNB of the MRN meets the gateway relocation condition in the following way:

judging whether a tracking area supported by the target DeNB contains a tracking area supported by the MRN; or, judging whether a tracking area supported by the target DeNB contains a tracking area supported by a DeNB in which a gateway currently serving the MRN is located.

Alternatively, the second judgment unit is configured to judge whether the target DeNB of the MRN meets the gateway relocation condition in the following way:

judging whether a public land mobile network, PLMN, in which the target DeNB is located contains a PLMN in which the MRN is located; or, judging whether a PLMN in which the target DeNB is located contains a PLMN in which the DeNB in which the gateway currently serving the MRN is located is located.

The embodiment of the present document further provides a mobility management entity, which comprises: a receiving unit and a relocation judgment unit, wherein:

the receiving unit is configured to: in a process of a mobile relay node, MRN, performing handover of a donor evolved Node B, DeNB, receive relocation judgment indication information; and the relocation judgment unit is configured to: judge whether it is required to execute a relocation of a gateway serving the MRN according to the relocation judgment indication information;

wherein, the relocation judgment indication information is sent to the receiving unit after a source DeNB or a target DeNB of the MRN judges whether it is required to execute the relocation of the gateway serving the MRN according to relocation judgment auxiliary information; or the relocation judgment indication information is sent to the receiving unit after a target DeNB of the MRN judges whether it is required to execute the relocation of the gateway serving the MRN according to configuration information.

Alternatively, the relocation judgment unit is configured to judge whether it is required to execute the relocation of the gateway serving the MRN according to the relocation judgment indication information in the following way:

in a case that the relocation judgment indication information is explicit indication information, judging that it is required to execute the relocation of the gateway serving the MRN when the relocation judgment indication information indicates that it is required to execute the relocation; and judging that it is not required to execute the relocation of the gateway serving the MRN when the relocation judgment indication information is not received or the relocation judgment indication information indicates that it is not required to execute the relocation; or, in a case that the relocation judgment indication information is implicit indication information and the relocation judgment indication information is implicitly indicated using an address of the gateway serving the MRN, judging that it is required to execute the relocation of the gateway serving the MRN when the address is received; and judging that it is not required to execute the relocation of the gateway serving the MRN when the address is not received.

The embodiment of the present document further provides a donor evolved Node B, which comprises: a judgment unit and a sending unit, wherein:

the judgment unit is configured to: in a process of a mobile relay node, MRN, performing handover of a donor evolved Node B, DeNB, judge whether it is required to execute a relocation of a gateway serving the MRN according to relocation judgment auxiliary information; or, judge whether it is required to execute a relocation of a gateway serving the MRN according to configuration information; and the sending unit is configured to: send relocation judgment indication information to a mobility management entity, MME, of the MRN.

Alternatively, the relocation judgment auxiliary information comprises: counting information used for counting times of handover occurrence in the MRN after the last gateway relocation occurs; or, indication information in a history accessing cell list of the MRN and used for marking a source cell or a target cell when the gateway relocation occurs in the MRN; or, identification information of a source cell or a target cell when the gateway relocation occurs in the MRN; or, history accessing cell record information of the MRN after the last gateway relocation occurs.

Alternatively, the judgment unit is configured to judge whether it is required to execute the relocation of the gateway serving the MRN according to the relocation judgment auxiliary information in the following way:

determining, according to the relocation judgment auxiliary information, the number of cells which the MRN accesses after the last relocation of the gateway serving the MRN; and judging whether the number of cells which the MRN accesses after the last relocation of the gateway serving the MRN reaches an accessing cell number threshold value, and if the number of cells which the MRN accesses after the last relocation of the gateway serving the MRN reaches the accessing cell number threshold value, judging that it is required to execute the relocation of the gateway serving the MRN.

Alternatively, the sending unit is configured to send the relocation judgment indication information to the MME of the MRN in the following way:

in a system architecture that the gateway serving the MRN is built in the DeNB, if the judgment unit judges that it is required to execute the relocation of the gateway serving the MRN, taking address information of the gateway serving the MRN as the relocation judgment indication information to send to the MME.

Alternatively, the donor evolved Node B further comprises an information maintenance unit, wherein:

the information maintenance unit is configured to: when the relocation judgment auxiliary information contains the counting information, clear the counting information after executing the relocation of the gateway serving the MRN in the current handover process, wherein, the counting information is obtained by the source DeNB or the target DeNB of the MRN adding 1 to the counting information every time the handover process of the MRN occurs without executing the relocation of the gateway serving the MRN;

when the relocation judgment auxiliary information contains the indication information, add the indication information into an item of the source cell or the target cell corresponding to the current handover in the history accessing cell list of the MRN;

when the relocation judgment auxiliary information contains the identification information, set identification information of the source cell or the target cell corresponding to the current handover as the relocation judgment auxiliary information; and when the relocation judgment auxiliary information contains the history accessing cell record information of the MRN after the last gateway relocation occurs, clear the history accessing cell record information.

In conclusion, in the embodiments of the present document, the problem of judging whether to execute the gateway relocation in the handover process of the MRN can be solved, so that routing optimization is smoothly executed, thereby shortening the delay of UE data and signaling.

PREFERRED EMBODIMENTS OF THE INVENTION

Figure 1:
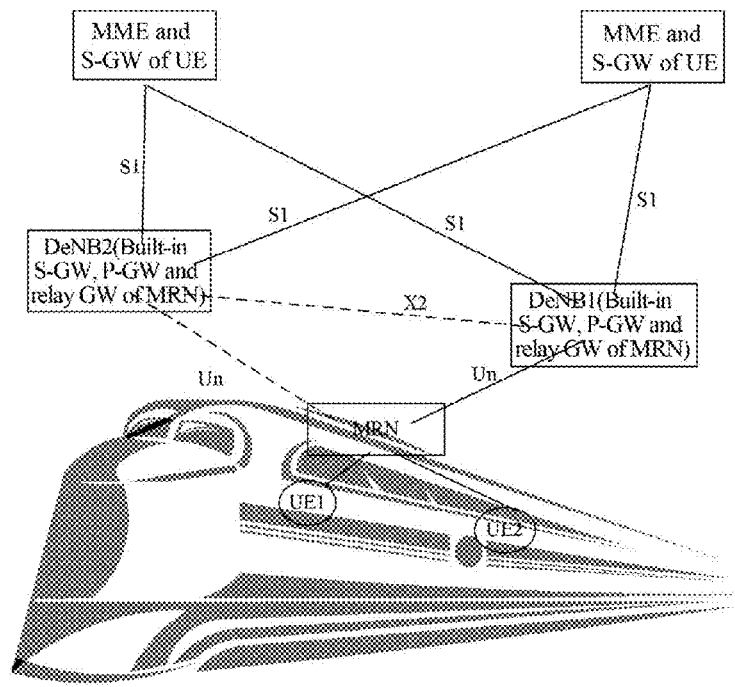
FIG. 1 is a schematic diagram of architecture 1 of a mobile relay system in a high-speed rail scenario.
Figure 2:
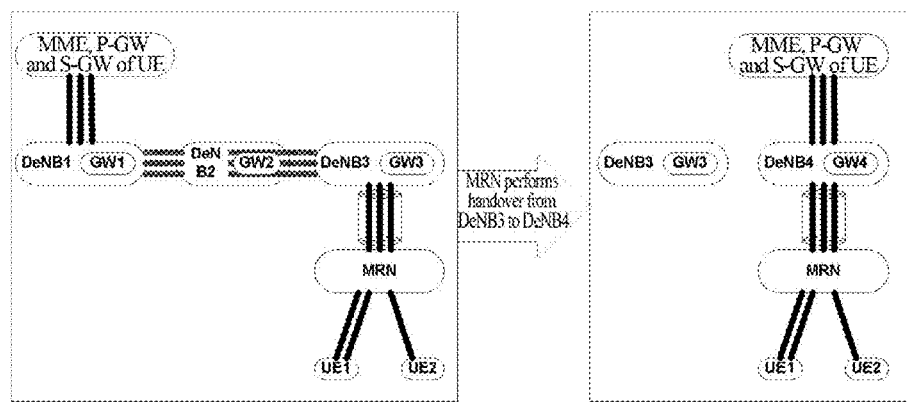
FIG. 2 is a schematic diagram of routing optimization in architecture 1 of a mobile relay system.

In an embodiment, in a process of a mobile relay node performing handover of a donor evolved Node B, a mobility management entity serving the mobile relay node judges whether it is required to execute a relocation of a gateway serving the mobile relay node according to a current location of the mobile relay node.

The mobility management entity judging whether it is required to execute the relocation of the gateway serving the mobile relay node according to the current location of the mobile relay node includes:

the mobility management entity judging whether it is required to execute the relocation of the gateway serving the mobile relay node according to a distance between the mobile relay node and the gateway serving the mobile relay node; when the distance between the mobile relay node and the gateway currently serving the mobile relay node is greater than a gateway relocation distance threshold value, the mobility management entity judging that it is required to execute the relocation of the gateway serving the mobile relay node, and when the distance between the mobile relay node and the gateway currently serving the mobile relay node is not greater than the gateway relocation distance threshold value, the mobility management entity judging that it is not required to execute the relocation of the gateway.

The mobility management entity judging whether it is required to execute the relocation of the gateway serving the mobile relay node according to the distance between the mobile relay node and the gateway serving the mobile relay node includes:

the mobility management entity saving location related information of the gateway currently serving the mobile relay node, wherein, the location related information of the gateway serving the mobile relay node refers to a tracking area code and/or a cell identifier of a cell in the donor evolved Node B in which the gateway is located, and the cell refers to a cell serving the mobile relay node in the donor evolved Node B when the mobile relay node accesses the donor evolved Node B;

the mobility management entity obtaining a location of the gateway serving the mobile relay node according to the location related information of the gateway serving the mobile relay node;

the mobility management entity obtaining the current location of the mobile relay node according to the tracking area code and/or the cell identifier of the cell in the donor evolved Node B in which the mobile relay node is located; and according to the current location of the mobile relay node and the location of the gateway serving the mobile relay node, the mobility management entity determining the distance between the mobile relay node and the gateway serving the mobile relay node, and judging whether it is required to execute the relocation of the gateway serving the mobile relay node.

In an embodiment, in a process of a mobile relay node performing handover of a donor evolved Node B, a mobility management entity of the mobile relay node receives relocation judgment indication information, and judges whether it is required to execute a relocation of a gateway serving the mobile relay node according to the relocation judgment indication information;

wherein, the relocation judgment indication information is sent to the mobility management entity after a source donor evolved Node B or a target donor evolved Node B of the mobile relay node judges whether it is required to execute the relocation of the gateway serving the mobile relay node according to relocation judgment auxiliary information; or the relocation judgment indication information is sent to the mobility management entity after a target donor evolved Node B of the mobile relay node judges whether it is required to execute relocation of the gateway serving the mobile relay node according to configuration information.

The relocation judgment indication information is used for indicating whether it is required to execute the relocation of the gateway.

The relocation judgment auxiliary information includes:

counting information used for counting times of handover occurrence in the MRN after the last gateway relocation occurs; wherein, after every time the handover occurs in the mobile relay node, it is required to add up the counting information, and the counting information is transferred between the source donor evolved Node B and the target donor evolved Node B;

or, indication information in a history accessing cell list of the mobile relay node and used for marking a source cell or a target cell when the mobile relay node occurs the gateway relocation; wherein, the indication information can be one bit and can be marked in an item of the corresponding source cell or target cell in the history accessing cell list;

or, identification information of a source cell or a target cell when the gateway relocation occurs in the mobile relay node, wherein, the identification information at least includes a cell identifier;

or, history accessing cell record information of the MRN after the last gateway relocation occurs.

The relocation judgment auxiliary information is saved and maintained by a donor evolved Node B which saves context information of the mobile relay node. When the handover occurs in the mobile relay node, the source donor evolved Node B sends the relocation judgment auxiliary information to the target donor evolved Node B directly or through other network elements.

The donor evolved Node B which saves the context information of the mobile relay node saving and maintaining the relocation judgment auxiliary information includes: if the source donor evolved Node B or the target donor evolved Node B judges that it is required to execute the relocation of the gateway:

in a case that the relocation judgment auxiliary information is the counting information, the source donor evolved Node B or the target donor evolved Node B clearing the counting information, wherein, the counting information is obtained by the source DeNB or the target DeNB of the MRN adding 1 to the counting information every time the handover process of the MRN occurs without executing the relocation of the gateway serving the MRN;

in a case that the relocation judgment auxiliary information is the indication information, the source donor evolved Node B or the target donor evolved Node B adding the indication information into an item of the source cell or the target cell corresponding to the current handover in the history accessing cell list of the mobile relay node;

in a case that the relocation judgment auxiliary information is the cell identifier information, the source donor evolved Node B or the target donor evolved Node B setting identification information of the source cell or the target cell corresponding to the current handover as the relocation judgment auxiliary information; and in a case that the relocation judgment auxiliary information is the history accessing cell record information, the source donor evolved Node B or the target donor evolved Node B clearing the history accessing cell record information. After the handover occurs to the mobile relay node, it is required to update the history accessing cell record information.

The above configuration information is indication information indicating whether it is required to execute the relocation of the gateway serving the MRN; for example, Operation Administration and Maintenance (OAM) of a network management system configures the configuration information indicating that it is required to execute the gateway relocation for the DeNBs deployed within the stations along the high-speed rail.

The source donor evolved Node B or the target donor evolved Node B of the mobile relay node judging whether it is required to execute the relocation of the gateway serving the mobile relay node according to the relocation judgment auxiliary information includes:

the source donor evolved Node B or the target donor evolved Node B, according to the relocation judgment auxiliary information, determining the number of cells which the mobile relay node accesses after the last gateway relocation; and the source donor evolved Node B or the target donor evolved Node B judging whether the number of cells which the mobile relay node accesses after the last relocation of the gateway serving the mobile relay node reaches an accessing cell number threshold value, and if the number of cells which the mobile relay node accesses after the last relocation of the gateway serving the mobile relay node reaches the accessing cell number threshold value, judging that it is required to execute the relocation of the gateway serving the mobile relay node.

The accessing cell number threshold value can be obtained by means of pre-configuration, and it also can be obtained from the network management system.

The source donor evolved Node B or the target donor evolved Node B determining the number of cells which the mobile relay node accesses after the last gateway relocation according to the relocation judgment auxiliary information includes that:

(1) when the relocation judgment auxiliary information is the counting information, the number of actually accessing cells after the gateway is relocated can be directly obtained according to the value;

(2) when the relocation auxiliary information is the indication information, it is to calculate the number of cells which the MRN accesses after the item in which the indication information is located in the history accessing cell list of the mobile relay node. When the indication information corresponds to the source cell, it is also required to subtract 1 from the calculated value, so as to obtain the number of actually accessing cells after the gateway is relocated;

(3) when the relocation auxiliary information is the identification information, the identification information is searched from the history accessing cell list of the mobile relay node, and the number of cells which the MRN accesses after the item in which the identification information is located in the list is calculated, when the identification information is identification information of the source cell, it is also required to subtract 1 from the calculated value, so as to obtain the number of actually accessing cells after the gateway is relocated;

(4) when the relocation auxiliary information is the history accessing cell record information in the history accessing cell list of the mobile relay node after the last gateway relocation occurs, it is to directly calculate the number of records contained in the history accessing cell record information, so as to obtain the number of actually accessing cells after the gateway is relocated.

The history accessing cell list in the above (2) and (3) can be the one history accessing cell list, while the history accessing cell list in the (4) can be a history accessing cell list different from the history accessing cell list in the (2) and (3). The history accessing cell list in the (2) and (3) can save the accessing cells before and after multiple times of gateway relocation; and the history accessing cell list in the (4) saves the accessing cells after the last gateway relocation.

The source donor evolved Node B or the target donor evolved Node B sends the relocation judgment indication information to the mobility management entity directly or through the other network elements.

The relocation judgment indication information is explicit indication information, or implicit information implicitly indicated by a particular cell. The particular cell includes address information of the gateway built in the donor evolved Node B.

The mobility management entity judging whether it is required to execute the relocation of the gateway serving the mobile relay node according to the relocation judgment indication information includes:

in a case that the relocation judgment indication information is the explicit indication information, the mobility management entity judging that it is required to execute the relocation of the gateway if the relocation judgment indication information indicates that it is required to execute the relocation of the gateway; and the mobility management entity judging that it is not required to execute the relocation of the gateway if the mobility management entity does not receive the relocation judgment indication information or the relocation judgment indication information indicates that it is not required to execute the relocation of the gateway;

in a case that the relocation judgment indication information is the implicit information and the particular cell used for indicating the implicit information is the address information of the gateway, if the mobility management entity receives the address information of the gateway, judging that it is required to execute the relocation of the gateway; and if the mobility management entity does not receive the address information of the gateway, judging that it is not required to execute the relocation of the gateway.

The relocation of the gateway includes relocation of a packet data network gateway and/or a service gateway serving the mobile relay node. After executing the relocation of the gateway serving the MRN, the mobility management entity transfers a PDN connection of the mobile relay node to the relocated gateway. The relocation of the gateway also can include the relocation of a relay gateway.

After the mobility management entity judges that it is required to execute the relocation of the gateway serving the mobile relay node, when the gateway serving the mobile relay node is built in a target donor evolved Node B of the mobile relay node, the mobility management entity judges whether the target donor evolved Node B of the mobile relay node meets a gateway relocation condition, if the target donor evolved Node B of the mobile relay node meets the gateway relocation condition, the mobility management entity determines to execute the relocation of the gateway serving the mobile relay node; and if the target donor evolved Node B of the mobile relay node does not meet the gateway relocation condition, the mobility management entity determines not to execute the relocation of the gateway serving the mobile relay node;

in an architecture that the gateway serving the mobile relay node is located in a core network, the MME determines to execute the relocation of the gateway serving the mobile relay node after judging that it is required to execute the relocation of the gateway serving the MRN.

In addition, the mobility management entity determines to execute the relocation of the gateway serving the mobile relay node after judging that it is required to execute the relocation of the gateway serving the mobile relay node.

The mobility management entity judging whether the target donor evolved Node B of the mobile relay node meets the gateway relocation condition includes:

the mobility management entity judging whether a tracking area supported by the target donor evolved Node B contains a tracking area supported by the mobile relay node;

or, the mobility management entity judging whether a tracking area supported by the target donor evolved Node B contains a tracking area supported by a donor evolved Node B in which a gateway currently serving the mobile relay node is located.

The mobility management entity judging whether the target donor evolved Node B of the mobile relay node meets the gateway relocation condition includes:

the mobility management entity judging whether a PLMN in which the target donor evolved Node B is located contains a PLMN in which the mobile relay node is located;

or, the mobility management entity judging whether a PLMN in which the target donor evolved Node B is located contains a PLMN in which the donor evolved Node B in which the gateway currently serving the mobile relay node is located is located.

The embodiments of the present document will be described in detail hereinafter in combination with the accompanying drawings. It should be noted that the embodiments in the present application and the characteristics in the embodiments can be optionally combined with each other under the condition of no conflict.

Figure 3:
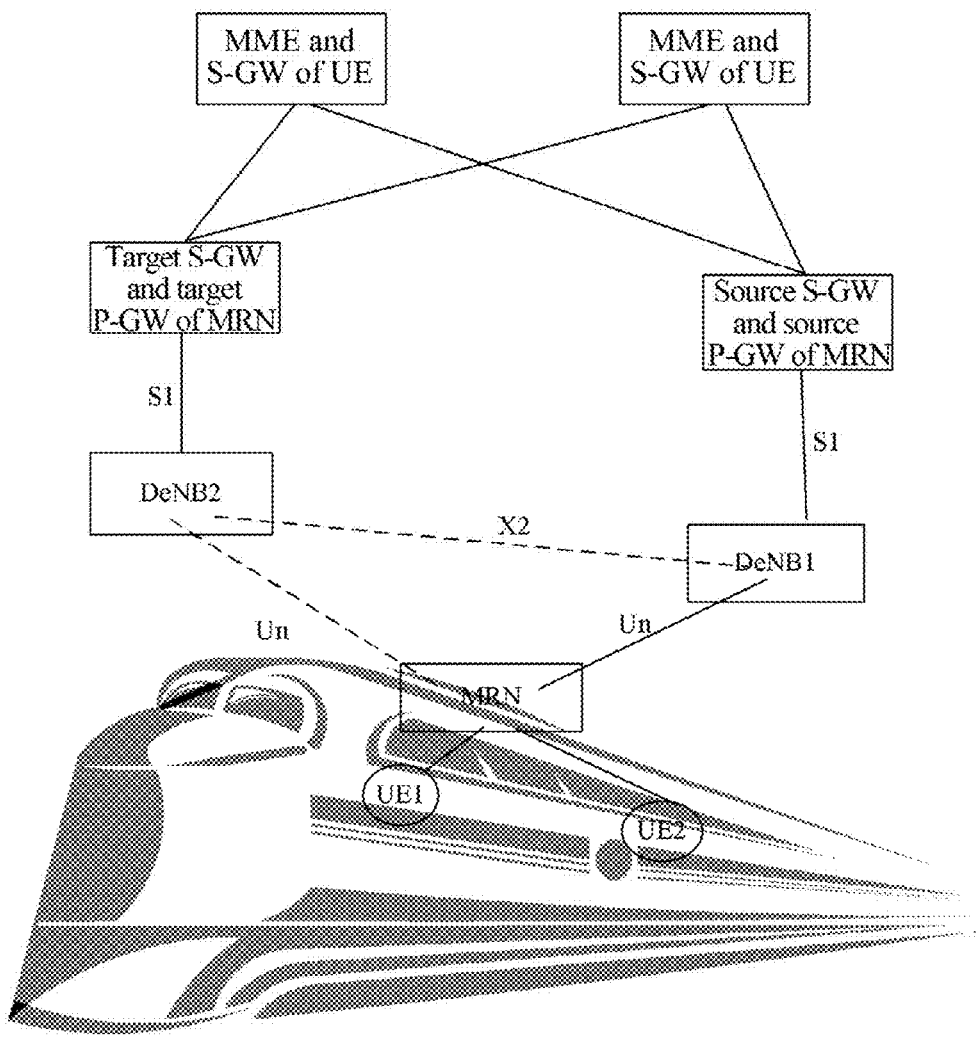
FIG. 3 is a schematic diagram of architecture 2 of a mobile relay system in a high-speed rail scenario.

All the following embodiments are applicable to the two mobile relay system architectures shown in FIG. 1 and FIG. 3. In the architecture shown in FIG. 1, the S-GW and the P-GW serving the MRN are all built in the DeNB, and in the architecture shown in FIG. 3, the S-GW and the P-GW serving the MRN are not built in the DeNB, but serve as independent network elements located in the core network.

Embodiment 1

Figure 4:
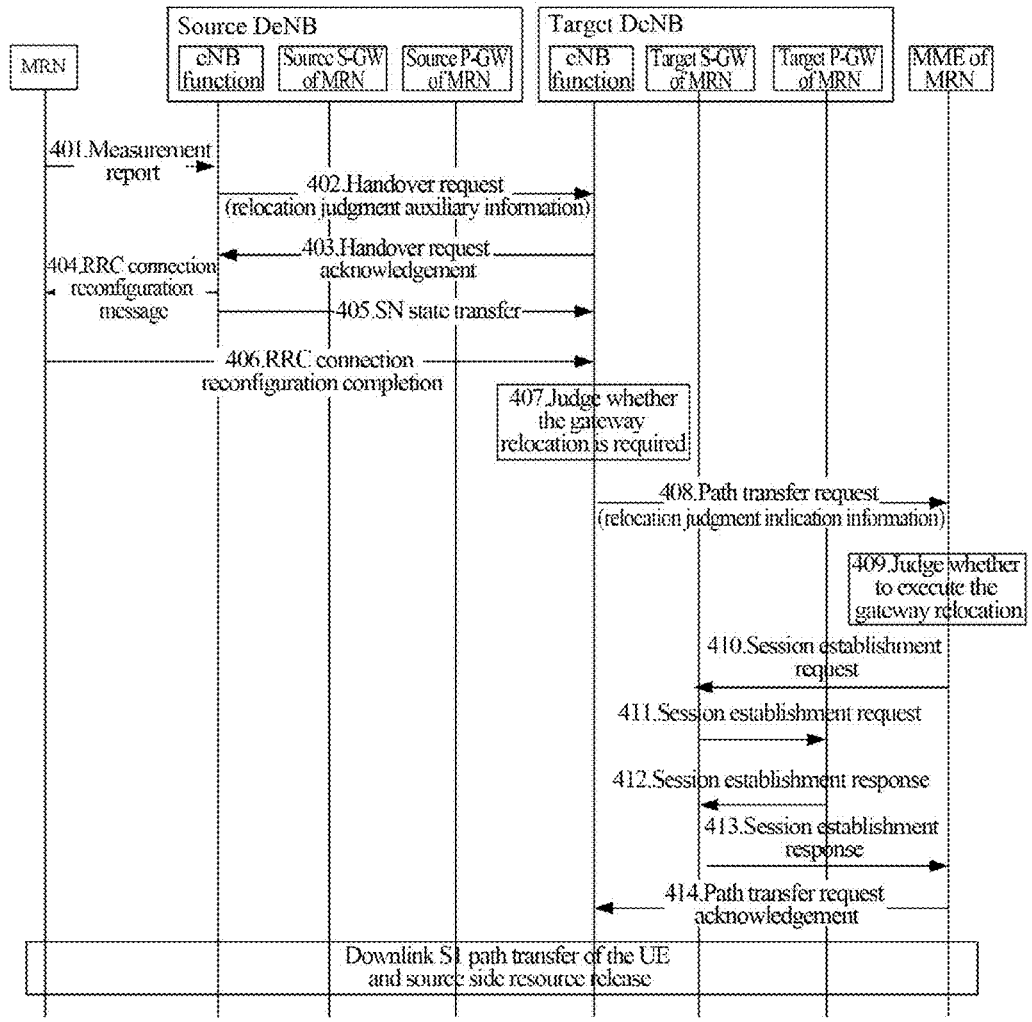
FIG. 4 is a flow chart of a method for gateway relocation according to an embodiment 1 of the present document.

The present embodiment describes a flow of executing gateway relocation in an X2 handover process of an MRN in a method for a target DeNB judging whether it is required to execute the gateway relocation and indicating to an MME. FIG. 4 describes the flow of the present embodiment, the flow is a flow in a condition of using the architecture shown in FIG. 1, wherein a source S-GW and a source P-GW of the MRN may be built in a source DeNB, or may be not built in the source DeNB but built in an initial DeNB. The method of the present embodiment is also applicable to the mobile relay system architecture shown in FIG. 3, the source S-GW and the source P-GW of the MRN, a target S-GW and a target P-GW of the MRN are all located in a core network. The flow of the present embodiment includes the following steps.

In step 401, the MRN measures that one or more cells meet a condition for triggering a measurement report, and then sends an identifier of a cell meeting the condition and measurement parameters to the source DeNB serving the MRN through the measurement report.

In step 402, after the source DeNB receives the measurement report of the MRN, if it is judged that an X2 interface exists between the source DeNB and the target DeNB, and the MRN is not required to change the MME after the handover, the source DeNB initiates an X2 handover for the MRN. The source DeNB selects one target cell for the MRN according to the measurement report. The source DeNB sends an X2 interface handover request message to the target DeNB. The handover request message contains relocation judgment auxiliary information, which is used for transferring the relocation judgment auxiliary information to the target DeNB. The relocation judgment auxiliary information includes one of the following:

1) counting information used for counting times of handover occurrence in the MRN after the last gateway relocation occurs;

2) indication information in a history accessing cell list of the MRN and used for marking a source cell or a target cell when the gateway relocation occurs in the MRN;

3) identification information of a source cell or a target cell when the gateway relocation occurs in the MRN, wherein, the cell identification information includes an Evolved Cell Global Identifier (ECGI);

4) history accessing cell record information of the MRN after the last gateway relocation occurs.

In step 403, the target DeNB reserves resources for the MRN and establishes context information according to information including Quality of Service (QoS) of an Evolved Universal Terrestrial Radio Access Network (EUTRAN)-Radio Access Bearer (E-RAB) required to be established in the handover request message, and then replies a handover request acknowledgement message. The handover request acknowledgement message contains a transparently transmitted handover command message of an air interface.

In step 404, the source DeNB sends an air interface message, Radio Resource Control (RRC) connection reconfiguration message, to the MRN, the RRC connection reconfiguration message carries the transparently transmitted handover command message which is sent by the target DeNB to the MRN through the source DeNB to indicate the MRN to execute the handover.

In step 405, the source DeNB sends a Sequence Number (SN) state transfer message to the target DeNB, which is used for transmitting uplink and downlink Packet Data Convergence Protocol (PDCP) SN receiving and sending states of a Radio Link Control Acknowledged Mode (RLC AM) radio bearer.

In step 406, after receiving a handover command, the MRN detaches from a cell of the source DeNB, synchronizes with a target cell, and initiates a Random Access Channel (RACH) process to access the target cell. After completing an RRC connection establishment between the MRN and the target cell, the MRN sends an RRC connection reconfiguration completion message to the target DeNB.

In step 407, the target DeNB judges whether it is required to execute the gateway relocation according to relocation judgment auxiliary information.

The target DeNB firstly determines the number of cells which the MRN accesses after the last gateway relocation according to the relocation judgment auxiliary information, and then judges whether it is required to execute the gateway relocation according to the number of accessing cells. If the number of cells which the MRN accesses after the last gateway relocation exceeds an accessing cell number threshold value preconfigured or acquired from OAM, it is to judge that it is required to execute the gateway relocation; and if the number of cells which the MRN accesses after the last gateway relocation does not exceed the accessing cell number threshold value preconfigured or acquired from the OAM, it is to judge that it is not required to execute the gateway relocation. In addition, the target DeNB is also required to save and maintain the relocation judgment auxiliary information. If the target DeNB judges that it is required to execute the gateway relocation, and, 1) in a case that the relocation judgment auxiliary information is the counting information, the target DeNB clears the counting information, wherein, the counting information is obtained by the source DeNB or the target DeNB of the MRN adding 1 to the counting information every time the MRN has a handover process that it is not required to execute the relocation of the gateway serving the MRN;

2) in a case that the relocation judgment auxiliary information is the indication information, the target DeNB adds the indication information into an item of the source cell or the target cell corresponding to the current handover in the history accessing cell list of the mobile relay node;

3) in a case that the relocation judgment auxiliary information is the cell identification information, the target DeNB sets identification information of the source cell or the target cell corresponding to the current handover as the relocation judgment auxiliary information; and 4) in a case that the relocation judgment auxiliary information is the history accessing cell record information, the target DeNB clears the history accessing cell record information. After the handover occurs in the mobile relay node, it is required to perform updating of the history accessing cell record information.

In step 408, after receiving the RRC connection reconfiguration completion message sent by the MRN, the target DeNB sends a path transfer request message to the MME of the MRN to update an S1 user plane and control plane path of the MRN. The path transfer request message contains relocation judgment indication information, which is used for indicating whether it is required to execute the gateway relocation.

The relocation judgment indication information can be explicit indication information. In a case that it is required to execute the gateway relocation, the path transfer request message also contains addresses of the S-GW and the P-GW built in the target DeNB, so as to assist the MME of the MRN to relocate the gateways of the MRN to the gateways in the target DeNB.

With adopting the mobile relay system architecture shown in FIG. 1, the relocation judgment indication information also can be implicit information implicitly indicated by a particular cell. The particular cell can be address information of the S-GW and the P-GW built in the target DeNB, and if it is required to execute the gateway relocation, it can be indicated to the MME by carrying the address information of the GWs built in the DeNB in the relocation judgment indication information.

In step 409, the MME judges whether to execute the gateway relocation. The MME firstly judges whether it is required to execute the gateway relocation according to the received relocation judgment indication information. The judgment process is described as follows:

1) in a case that the relocation judgment indication information is explicitly indicated, if the relocation judgment indication information indicates that it is required to execute the relocation of the gateway, the MME determines that it is required to execute the relocation of the gateway; and if the MME does not receive the relocation judgment indication information or the relocation judgment indication information indicates that it is not required to execute the relocation of the gateway, the MME determines that it is not required to execute the relocation of the gateway;

2) with adopting the mobile relay system architecture shown in FIG. 1, in a case that the relocation judgment indication information is the implicit information, and the particular cell used for indicating the implicit information is the address information of the gateways built in the DeNB, if the MME receives the address information of the gateways, it is to determine that it is required to execute the relocation of the gateways; and if the MME does not receive the address information of the gateways, it is to determine that it is not required to execute the relocation of the gateways.

The mobile relay system architecture shown in FIG. 1 is adopted in the present embodiment, if the MME determines that it is required to execute the relocation of the gateway, it is also required to judge whether the target DeNB meets a gateway relocation condition, if yes, the MME determines to execute the relocation of the gateways; otherwise, the MME determines not to execute the relocation of the gateways. If the MME determines to execute the relocation of the gateways, according to the addresses of the gateways received by the MME, the S-GW and the P-GW built in the target DeNB are selected as the new gateways serving the MRN (called as a target S-GW and a target P-GW).

Wherein the gateway relocation condition includes that: a Tracking Area (TA) supported by the target DeNB contains a TA supported by the MRN. If a means of configuring a dedicated TA for the MRN is adopted, the TA supported by the target DeNB is required to contain the dedicated TA; if a means of configuring a dedicated TA for the MRN is not adopted, the TA supported by the target DeNB is required to contain a TA supported by an initial DeNB (i.e., the DeNB in which the S-GW and the P-GW of the MRN are located).

In a case that the MRN supports network sharing, the gateway relocation condition also includes that: a PLMN in which the target DeNB is located is required to contain a PLMN in which the MRN is located. This condition can be judged by whether the PLMN in which the target DeNB is located contains a PLMN in which the initial DeNB is located.

The method of the present embodiment is also applicable to the mobile relay system architecture shown in FIG. 3. Therefore, if the MME judges that it is required to execute the relocation of the gateways, it is not required to judge whether the gateway relocation condition is met, and it determines to execute the relocation of the gateways serving the MRN; if the MME judges that it is not required to execute the relocation of the gateways, it determines not to execute the relocation of the gateways serving the MRN. If the MME determines to execute the relocation of the gateways, the MME reselects new gateways (called as the target S-GW and the target P-GW) serving the MRN and located in the core network.

In both the two architectures, it is also able to not judge whether the target DeNB meets the gateway relocation condition, and it is determined to execute the relocation of the gateways after requiring to execute the relocation of the gateways serving the MRN is judged.

In step 410, the MME of the MRN sends a session establishment request message to the target S-GW (an S-GW built in the target DeNB), wherein the session establishment request message includes Evolved Packet System (EPS) bearer information of the MRN required to be established and an address of the target P-GW (a P-GW built in the target DeNB).

In step 411, the target S-GW establishes a context of the MRN, and sends the session establishment request message to the target P-GW.

In step 412, after establishing the context of the MRN and the EPS bearer, the target P-GW replies a session establishment response message to the target S-GW. The target P-GW can allocate a new IP address for the MRN.

In a case that the system architecture shown in FIG. 1 is adopted in the present embodiment, the target S-GW and the target P-GW are built in the DeNB, all signalings in step 411 and step 412 are internal interface messages in the target DeNB.

In step 413, the target S-GW replies the session establishment response message to the MME of the MRN, to confirm that the establishment of the context of the MRN and the EPS bearer is completed.

In step 414, the MME of the MRN sends a path transfer request acknowledgement message to the target DeNB.

Afterwards, the MRN or the target DeNB can initiate a path transfer request process for a UE which the MRN serves to transfer a downlink S1 path of the UE. Then the target DeNB indicates the source DeNB and the built-in source S-GW and source P-GW to release resources of the MRN.

Embodiment 2

Figure 5:
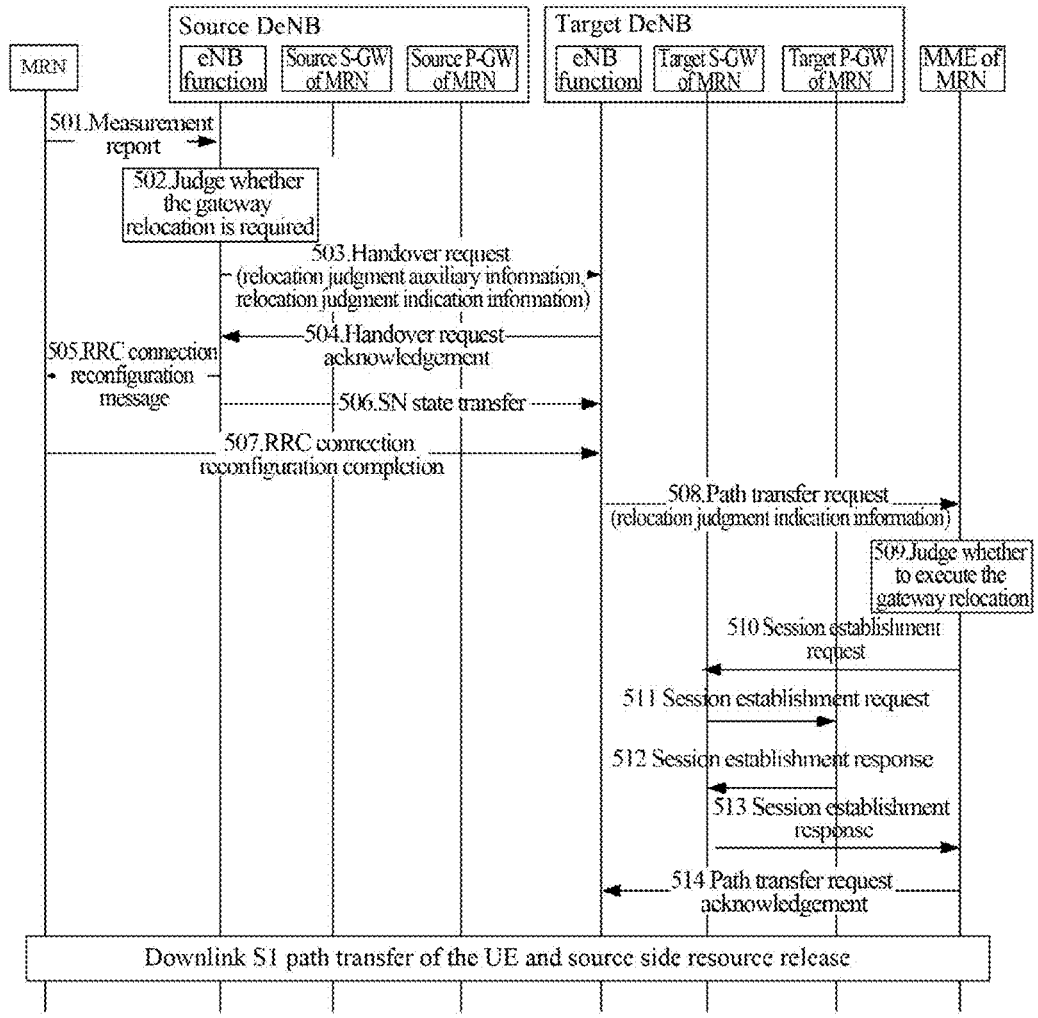
FIG. 5 is a flow chart of a method for gateway relocation according to an embodiment 2 of the present document.

The present embodiment describes a flow of executing gateway relocation in an X2 handover process of an MRN in a method for a source DeNB judging whether it is required to execute the gateway relocation and indicating to an MME through a target DeNB. FIG. 5 describes the flow of the present embodiment, the flow is a flow in the condition of adopting the architecture shown in FIG. 1, wherein a source S-GW and a source P-GW of the MRN may be built in the source DeNB, or may be not built in the source DeNB but built in an initial DeNB. The method of the present embodiment is also applicable to the mobile relay system architecture shown in FIG. 3, the source S-GW and the source P-GW of the MRN, a target S-GW and a target P-GW of the MRN are all located in a core network.

In step 501, the MRN measures that one or more cells meet a condition for triggering a measurement report, and sends an identifier of a cell meeting the condition and measurement parameters to the source DeNB serving the MRN through the measurement report.

In step 502, the source DeNB judges whether it is required to execute the relocation of the gateways according to relocation judgment auxiliary information in a context of the MRN maintained by the source DeNB.

The source DeNB firstly determines the number of cells which the MRN accesses after the last gateway relocation according to the relocation judgment auxiliary information, and then judges whether it is required to execute the gateway relocation according to the number of accessing cells. If the number of cells which the MRN accesses after the last gateway relocation exceeds an accessing cell number threshold value preconfigured or acquired from OAM, it is to judge that it is required to execute the gateway relocation; and if the number of cells which the MRN accesses after the last gateway relocation does not exceed the accessing cell number threshold value preconfigured or acquired from the OAM, it is to judge that it is not required to execute the gateway relocation.

The relocation judgment auxiliary information at least includes one of the following:

1) counting information used for counting times of handover occurrence in the MRN after the last gateway relocation occurs;

2) indication information in a history accessing cell list of the MRN and used for marking a source cell or a target cell when the gateway relocation occurs in the MRN;

3) identification information of a source cell or a target cell when the gateway relocation occurs in the MRN, wherein, the cell identification information includes a cell identifier ECGI;

4) history accessing cell record information of the MRN after the last gateway relocation Occurs.

In addition, the source DeNB is also required to maintain the relocation judgment auxiliary information according to a judgment result. If the source DeNB judges that it is required to execute the relocation of the gateways, then 1) in a case that the relocation judgment auxiliary information is the counting information, the source DeNB clears the counting information, wherein, the counting information is obtained by the source DeNB or the target DeNB of the MRN adding 1 to the counting information every time the MRN has a handover process that it is not required to execute the relocation of the gateway serving the MRN;

2) in a case that the relocation judgment auxiliary information is the indication information, the source DeNB adds the indication information into an item of the source cell or the target cell corresponding to the current handover in the history accessing cell list of the mobile relay node;

3) in a case that the relocation judgment auxiliary information is the cell identification information, the source DeNB sets identification information of the source cell or the target cell corresponding to the current handover as the relocation judgment auxiliary information; and 4) in a case that the relocation judgment auxiliary information is the history accessing cell record information, the target DeNB clears the history accessing cell record information. After the handover occurs in the mobile relay node, it is required to perform updating of the history accessing cell record information.

In step 503, after the source DeNB receives the measurement report of the MRN, if it is judged that an X2 interface exists between the source DeNB and the target DeNB, and the MRN is not required to change the MME after the handover, the source DeNB initiates an X2 handover for the MRN. The source DeNB selects one target cell for the MRN according to the measurement report. The source DeNB sends an X2 interface handover request message to the target DeNB. The handover request message contains the relocation judgment auxiliary information, which is used for transferring the relocation judgment auxiliary information to the target DeNB. The handover request message also contains relocation judgment indication information, which is used for indicating whether it is required to execute the relocation of the gateways.

Steps 504-507 are the same as steps 403-406, which will not be repeated herein.

In step 508, after receiving the RRC connection reconfiguration completion message sent by the MRN, the target DeNB sends a path transfer request message to the MME of the MRN, to update an S1 user plane and control plane path of the MRN. The path transfer request message contains relocation judgment indication information, which is used for indicating whether it is required to execute the gateway relocation.

The relocation judgment indication information can be explicit indication information. In a case that it is required to execute the gateway relocation, the path transfer request message also contains addresses of the S-GW and the P-GW built in the target DeNB, so as to assist the MME of the MRN to relocate the gateways of the MRN to the gateways in the target DeNB.

With adopting the mobile relay system architecture shown in FIG. 1, the relocation judgment indication information also can be implicit information implicitly indicated by a particular cell. The particular cell can be address information of the S-GW and the P-GW built in the target DeNB, and if it is required to execute the gateway relocation, it can be indicated to the MME by carrying the address information of the GWs built in the DeNB in the relocation judgment indication information.

In step 509, the MME judges whether to execute the gateway relocation. The MME firstly judges whether it is required to execute the gateway relocation according to the received relocation judgment indication information. The judgment process is described as follows:

1) in a case that the relocation judgment indication information is explicitly indicated, if the relocation judgment indication information indicates that it is required to execute the relocation of the gateway, the MME determines that it is required to execute the relocation of the gateway; and if the MME does not receive the relocation judgment indication information or the relocation judgment indication information indicates that it is not required to execute the relocation of the gateway, the MME determines that it is not required to execute the relocation of the gateway;

2) with adopting the mobile relay system architecture shown in FIG. 1, in a case that the relocation judgment indication information is the implicit information, and the particular cell used for indicating the implicit information is the address information of the gateways built in the DeNB, if the MME receives the address information of the gateways, it is to determine that it is required to execute the relocation of the gateways; and if the MME does not receive the address information of the gateways, it is to determine that it is not required to execute the relocation of the gateways.

The mobile relay system architecture shown in FIG. 1 is adopted in the present embodiment, if the MME determines that it is required to execute the relocation of the gateway, it is also required to judge whether the target DeNB meets a gateway relocation condition, if yes, the MME determines to execute the relocation of the gateways; otherwise, the MME determines not to execute the relocation of the gateways. If the MME determines to execute the relocation of the gateways, according to the addresses of the gateways received by the MME, the S-GW and the P-GW built in the target DeNB are selected as the new gateways serving the MRN (called as a target S-GW and a target P-GW).

Wherein the gateway relocation condition includes that: a Tracking Area (TA) supported by the target DeNB contains a TA supported by the MRN. If a means of configuring a dedicated TA for the MRN is adopted, the TA supported by the target DeNB is required to contain the dedicated TA; if a means of configuring a dedicated TA for the MRN is not adopted, the TA supported by the target DeNB is required to contain a TA supported by an initial DeNB (i.e., the DeNB in which the S-GW and the P-GW of the MRN are located).

In a case that the MRN supports network sharing, the gateway relocation condition also includes that: a PLMN supported by the target DeNB is required to contain a PLMN supported by the MRN. This condition can be judged by whether the PLMN supported by the target DeNB contains a PLMN supported by the initial DeNB.

The method of the present embodiment is also applicable to the mobile relay system architecture shown in FIG. 3. Therefore, if the MME judges that it is required to execute the relocation of the gateways, it is not required to judge whether the gateway relocation condition is met, and it determines to execute the relocation of the gateways serving the MRN; if the MME judges that it is not required to execute the relocation of the gateways, it determines not to execute the relocation of the gateways serving the MRN. If the MME determines to execute the relocation of the gateways, the MME reselects new gateways (called as the target S-GW and the target P-GW) serving the MRN and located in the core network.

Steps 510-514 are the same as steps 410-414, which will not be repeated herein.

Embodiment 3

Figure 6:
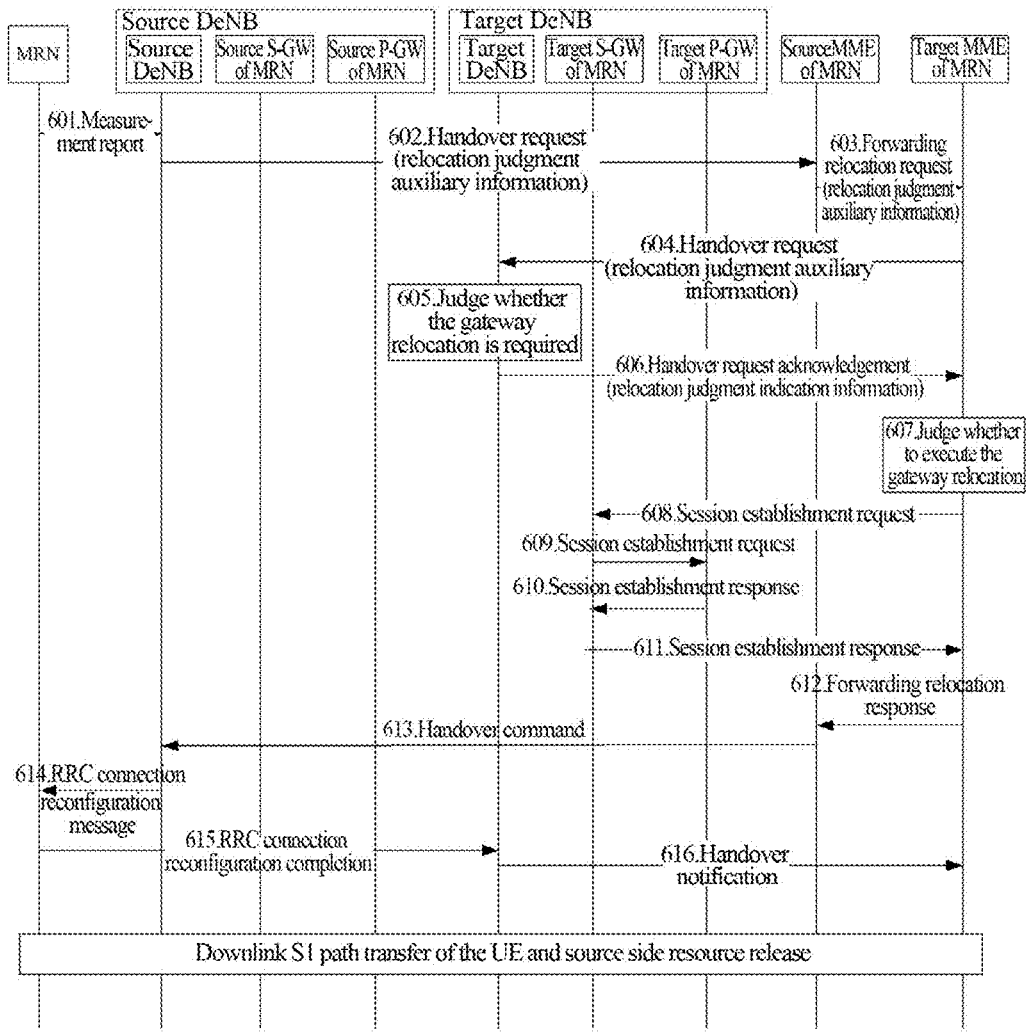
FIG. 6 is a flow chart of a method for gateway relocation according to an embodiment 3 of the present document.

The present embodiment describes a flow of executing gateway relocation in an S1 handover process of an MRN in a method for a target DeNB judging whether it is required to execute the gateway relocation and indicating to an MME. FIG. 6 describes the flow of the present embodiment, the process is a flow in a condition of using the architecture shown in FIG. 1, wherein a source S-GW and a source P-GW of the MRN may be built in a source DeNB, or may be not built in the source DeNB but built in an initial DeNB. The method of the present embodiment is also applicable to the mobile relay system architecture shown in FIG. 3, the source S-GW and the source P-GW of the MRN, a target S-GW and a target P-GW of the MRN are all located in a core network. The flow of the present embodiment includes the following steps.

In step 601, the MRN measures that one or more cells meet a condition for triggering a measurement report, and then sends an identifier of a cell meeting the condition and measurement parameters to the source DeNB serving the MRN through the measurement report.

In step 602, after the source DeNB receives the measurement report of the MRN, if it is judged that an X2 interface does not exist between the source DeNB and the target DeNB, or it is required to reselect one MME for the MRN, it is required to execute an S1 handover for it, and the source DeNB selects one target cell for the MRN according to the measurement report. The source DeNB sends an S1 interface handover request message to a source MME of the MRN. The handover request message contains relocation judgment auxiliary information, which is used for transferring the relocation judgment auxiliary information to the target DeNB. The relocation judgment auxiliary information is stored in a context of the MRN in the source DeNB. The source DeNB can send the relocation judgment auxiliary information through a transparently transmitting container from a source base station to a target base station. The relocation judgment auxiliary information at least includes one of the following:

1) counting information used for counting times of handover occurrence in the MRN after the last gateway relocation occurs;

2) indication information in a history accessing cell list of the MRN and used for marking a source cell or a target cell when the gateway relocation occurs in the MRN;

3) identification information of a source cell or a target cell when the gateway relocation occurs in the MRN, wherein, the cell identification information includes a cell identifier ECGI;

4) history accessing cell record information of the MRN after the last gateway relocation occurs.

In step 603, the source MME judges whether it is required to select a new MME according to a base station identifier or a target Tracking Area Identifier (TAI) of the target DeNB in the received handover request message, and if it is required to select a new MME, selects a target MME according to the two parameters, and sends a forwarding relocation request message to the target MME, wherein the forwarding relocation request message carries information of the transparently transmitting container from the source base station to the target base station, a target base station identifier, a target location area identifier, and the context information of the MRN, etc. If the source MME of the MRN receives the relocation judgment auxiliary information from the source DeNB, the forwarding relocation request message contains the received relocation judgment auxiliary information. The relocation judgment auxiliary information can be contained in the transparently transmitting container from the source base station to the target base station.

In step 604, the target MME of the MRN sends the S1 interface handover request message to the target DeNB. The S1 interface handover request message contains the relocation judgment auxiliary information received by the target MME from the source MME. The relocation judgment auxiliary information can be contained in the transparently transmitting container from the source base station to the target base station.

In step 605, the target DeNB judges whether it is required to execute the gateway relocation according to relocation judgment auxiliary information. The target DeNB firstly determines the number of cells which the MRN accesses after the last gateway relocation according to the relocation judgment auxiliary information, and then judges whether it is required to execute the gateway relocation according to the number of accessing cells. If the number of cells which the MRN accesses after the last gateway relocation exceeds an accessing cell number threshold value preconfigured or acquired from OAM, it is to judge that it is required to execute the gateway relocation; and if the number of cells which the MRN accesses after the last gateway relocation does not exceed the accessing cell number threshold value preconfigured or acquired from the OAM, it is to judge that it is not required to execute the gateway relocation. In addition, the target DeNB is also required to save and maintain the relocation judgment auxiliary information. If the target DeNB judges that it is required to execute the gateway relocation, and, 1) in a case that the relocation judgment auxiliary information is the counting information, the target DeNB clears the counting information, wherein, the counting information is obtained by the source DeNB or the target DeNB of the MRN adding 1 to the counting information every time the MRN has a handover process that it is not required to execute the relocation of the gateway serving the MRN;

2) in a case that the relocation judgment auxiliary information is the indication information, the target DeNB adds the indication information into an item of the source cell or the target cell corresponding to the current handover in the history accessing cell list of the mobile relay node;

3) in a case that the relocation judgment auxiliary information is the cell identification information, the target DeNB sets identification information of the source cell or the target cell corresponding to the current handover as the relocation judgment auxiliary information; and 4) in a case that the relocation judgment auxiliary information is the history accessing cell record information, the target DeNB clears the history accessing cell record information. After the handover occurs in the mobile relay node, it is required to perform updating of the history accessing cell record information.

In step 606, after establishing the context for the MRN and the UE and reserving resources for a bearer of the MRN, the target DeNB sends a handover request acknowledgement message to the target MME of the MRN. The handover request acknowledgement message contains relocation judgment indication information, which is used for indicating whether it is required to execute the gateway relocation.

The relocation judgment indication information can be explicit indication information. In a case that it is required to execute the gateway relocation, the path transfer request message also contains addresses of the S-GW and the P-GW built in the target DeNB, so as to assist the MME of the MRN to relocate the gateways of the MRN to the gateways in the target DeNB.

With adopting the mobile relay system architecture shown in FIG. 1, the relocation judgment indication information also can be implicit information implicitly indicated by a particular cell. The particular cell can be address information of the S-GW and the P-GW built in the target DeNB, and if it is required to execute the gateway relocation, it can be indicated to the MME by carrying the address information of the GWs built in the DeNB in the relocation judgment indication information.

Steps 607-611 are the same as steps 509-513, which will not be repeated herein.

It should be noted that, in a case that the target S-GW and the target P-GW are built in the DeNB, all signalings in step 609 and step 610 are internal interface messages in the target DeNB.

In step 612, the target MME of the MRN sends a forwarding relocation response message to the source MME.

It should be noted that, if it is not required to select a new MME, step 603 and step 612 are skipped, and the behaviors of the source MME and the target MME are the behaviors of the same MME.

In step 613, the source MME of the MRN sends an S1 interface handover command message to the source DeNB.

In step 614, the source DeNB sends an air interface message RRC connection reconfiguration message to the MRN, the RRC connection reconfiguration message carries the handover command message in the transparently transmitting container sent by the target DeNB to the source DeNB through the MME of the MRN, so as to indicate the MRN to execute the handover.

In step 615, after receiving the handover command, the MRN detaches from a cell of the source DeNB, synchronizes with a target cell, and initiates an RACH process to access the target cell. After completing an RRC connection establishment between the MRN and the target cell, the MRN sends an RRC connection reconfiguration completion message to the target DeNB.

In step 616, the target DeNB sends an S1 interface handover notification message to the target MME of the MRN. Then the target MME of the MRN completes the following operations.

Afterwards, the MRN or the target DeNB can initiate a path transfer request process for a UE which the MRN serves to transfer a downlink S1 path of the UE. Then a resource release process of the source DeNB and the built-in source S-GW and source P-GW is executed.

It should be noted that steps 607-611 also can be executed after step 616.

In addition, the relocation judgment indication information can be not carried in step 606, the relocation judgment indication information can be carried in the handover notification message in step 616, and correspondingly, steps 607-611 are executed after step 616.

Embodiment 4

Figure 7:
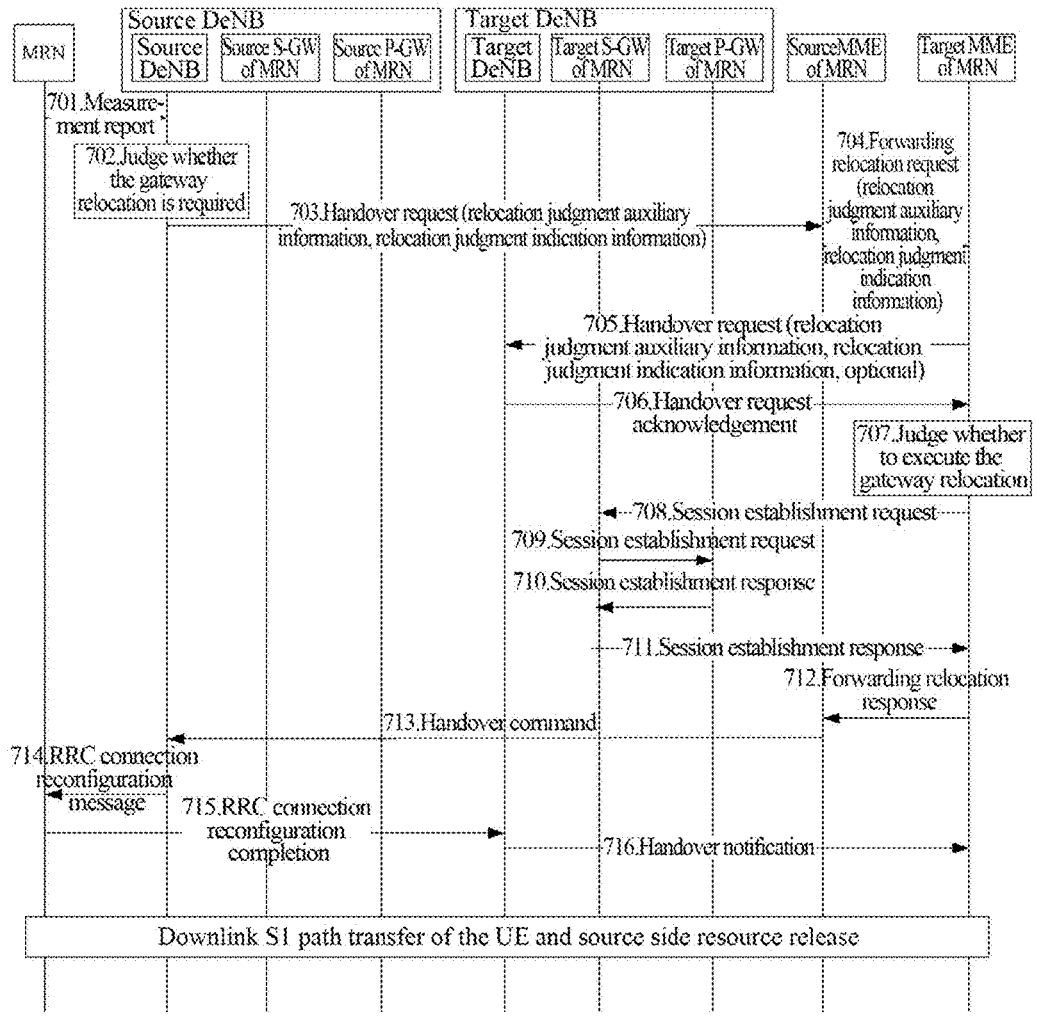
FIG. 7 is a flow chart of a method for gateway relocation according to an embodiment 4 of the present document.

The present embodiment describes a flow of executing gateway relocation in an S1 handover process of an MRN in a method for a source DeNB judging whether it is required to execute the gateway relocation and indicating to an MME. FIG. 7 describes the flow of the present embodiment, the process is a flow in a condition of using the architecture shown in FIG. 1, wherein a source S-GW and a source P-GW of the MRN may be built in a source DeNB, or may be not built in the source DeNB but built in an initial DeNB. The method of the present embodiment is also applicable to the mobile relay system architecture shown in FIG. 3, the source S-GW and the source P-GW of the MRN, a target S-GW and a target P-GW of the MRN are all located in a core network. The flow of the present embodiment includes the following steps.

In step 701, the MRN measures that one or more cells meet a condition for triggering a measurement report, and then sends an identifier of a cell meeting the condition and measurement parameters to the source DeNB serving the MRN through the measurement report.

Step 702 is the same as step 502, which will not be repeated herein.

In step 703, after the source DeNB receives the measurement report of the MRN, if it is judged that an X2 interface does not exist between the source DeNB and the target DeNB, or it is required to reselect one MME for the MRN, it is required to execute an S1 handover for it, and the source DeNB selects one target cell for the MRN according to the measurement report. The source DeNB sends an S1 interface handover request message to a source MME of the MRN. The handover request message contains relocation judgment auxiliary information, which is used for transferring the relocation judgment auxiliary information to the target DeNB. The relocation judgment auxiliary information is stored in a context of the MRN in the source DeNB. The source DeNB can send the relocation judgment auxiliary information through a transparently transmitting container from a source base station to a target base station. The handover request message also contains relocation judgment indication information, which is used for indicating whether it is required to execute the relocation of the gateways. Wherein, the relocation judgment auxiliary information at least includes one of the following:

1) counting information used for counting times of handover occurrence in the MRN after the last gateway relocation occurs;

2) indication information in a history accessing cell list of the MRN and used for marking a source cell or a target cell when the gateway relocation occurs in the MRN;

3) identification information of a source cell or a target cell when the gateway relocation occurs in the MRN, wherein, the cell identification information includes a cell identifier ECGI;

4) history accessing cell record information of the MRN after the last gateway relocation occurs.

In step 704, the source MME judges whether it is required to select a new MME according to a base station identifier or a target Tracking Area Identifier (TAI) of the target DeNB in the received handover request message, and if it is required to select a new MME, selects a target MME according to the two parameters, and sends a forwarding relocation request message to the target MME, wherein the forwarding relocation request message carries information of the transparently transmitting container from the source base station to the target base station, a target base station identifier, a target location area identifier, and the context information of the MRN, etc. If the source MME of the MRN receives the relocation judgment auxiliary information from the source DeNB, the forwarding relocation request message contains the received relocation judgment auxiliary information. The relocation judgment auxiliary information can be contained in the transparently transmitting container from the source base station to the target base station. If the source MME receives the relocation judgment indication information from the source DeNB, the forwarding relocation request message also contains the relocation judgment indication information.

In step 705, the target MME of the MRN sends the S1 interface handover request message to the target DeNB. The S1 interface handover request message contains the relocation judgment auxiliary information received by the target MME from the source MME. The relocation judgment auxiliary information can be contained in the transparently transmitting container from the source base station to the target base station. The S1 interface handover request message also can contain the relocation judgment indication information received from the source MME.

In step 706, after establishing the context for the MRN and the UE and reserving resources for a bearer of the MRN, the target DeNB sends a handover request acknowledgement message to the target MME of the MRN. If the target DeNB receives the relocation judgment indication information from the MME, and the relocation judgment indication information indicates that it is required to execute the gateway relocation, the handover request message also includes address information of the S-GW and the P-GW built in the target DeNB, so as to assist the MME of the MRN to relocate the gateways of the MRN to the gateways in the target DeNB.

In step 707, the target MME judges whether to execute the relocation of the gateways. The target MME firstly judges whether it is required to execute the relocation of the gateways according to the received relocation judgment indication information. If the relocation judgment indication information indicates that it is required to execute the relocation of the gateways, the target MME determines that it is required to execute the relocation of the gateways; and if the target MME does not receive the relocation judgment indication information or the relocation judgment indication information indicates that it is not required to execute the relocation of the gateways, the target MME determines that it is not required to execute the relocation of the gateways.

The mobile relay system architecture shown in FIG. 1 is adopted in the present embodiment, if the MME determines that it is required to execute the relocation of the gateway, it is also required to judge whether the target DeNB meets a gateway relocation condition, if yes, the MME determines to execute the relocation of the gateways; otherwise, the MME determines not to execute the relocation of the gateways. If the MME determines to execute the relocation of the gateways, according to the addresses of the gateways received by the MME, the S-GW and the P-GW built in the target DeNB are selected as the new gateways serving the MRN (called as a target S-GW and a target P-GW).

Wherein the gateway relocation condition includes that: a Tracking Area (TA) supported by the target DeNB contains a TA supported by the MRN. If a means of configuring a dedicated TA for the MRN is adopted, the TA supported by the target DeNB is required to contain the dedicated TA; if a means of configuring a dedicated TA for the MRN is not adopted, the TA supported by the target DeNB is required to contain a TA supported by an initial DeNB (i.e., the DeNB in which the S-GW and the P-GW of the MRN are located).

In a case that the MRN supports network sharing, the gateway relocation condition also includes that: a PLMN supported by the target DeNB is required to contain a PLMN supported by the MRN. This condition can be judged by whether the PLMN supported by the target DeNB contains a PLMN supported by the initial DeNB.

The method of the present embodiment is also applicable to the mobile relay system architecture shown in FIG. 3. Therefore, if the MME judges that it is required to execute the relocation of the gateways, it is not required to judge whether the gateway relocation condition is met, and it determines to execute the relocation of the gateways serving the MRN; if the MME judges that it is not required to execute the relocation of the gateways, it determines not to execute the relocation of the gateways serving the MRN. If the MME determines to execute the relocation of the gateways, the MME reselects new gateways (called as the target S-GW and the target P-GW) serving the MRN and located in the core network.

Steps 708-716 are the same as steps 608-616, which will not be repeated herein.

It should be noted that steps 707-711 also can be executed after step 616.

In addition, the relocation judgment indication information can be not carried in step 706, the relocation judgment indication information can be carried in the handover notification message in step 716, correspondingly, steps 707-711 are executed after step 716.

The method of the present embodiment is also applicable to the system architecture shown in FIG. 3, steps 707-711 also can be executed after step 704 and before step 705. In this system architecture, the target MME selects new S-GW and P-GW located in the core network for the MRN.

Method Embodiment 5

Figure 8:
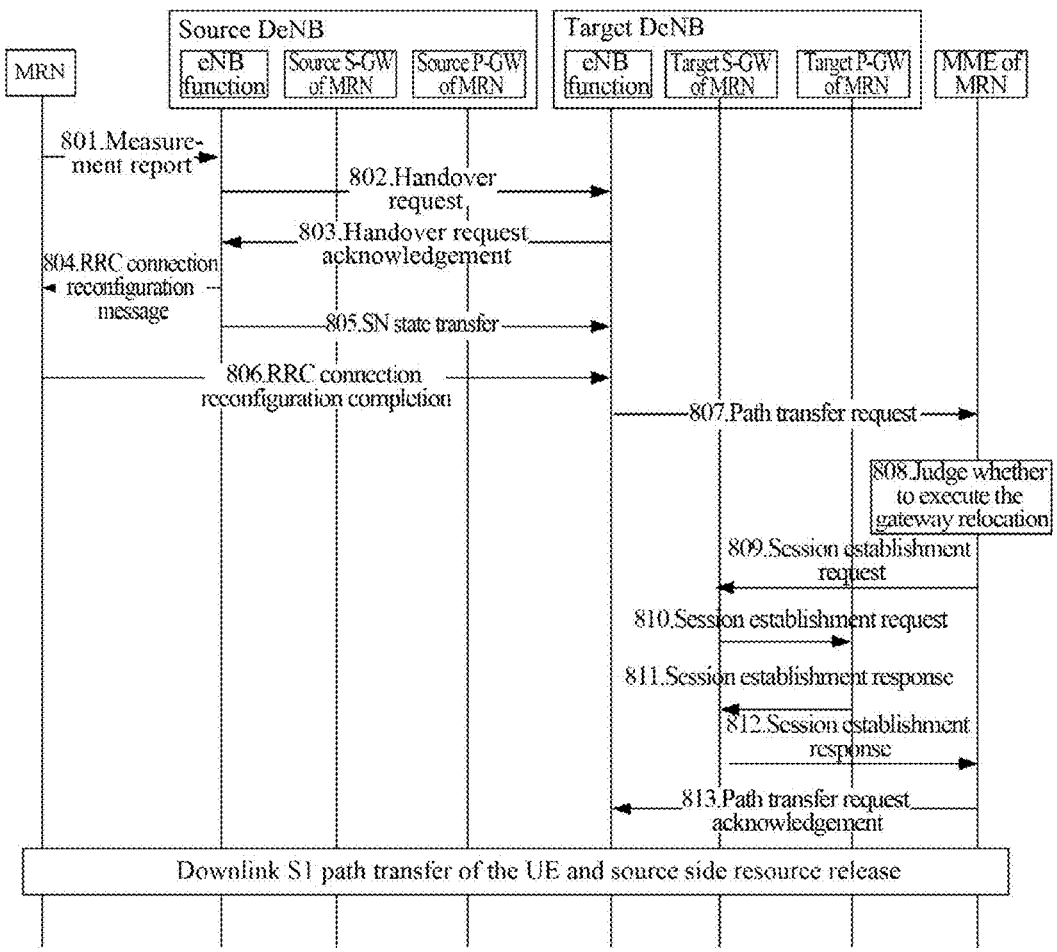
FIG. 8 is a flow chart of a method for gateway relocation according to an embodiment 5 of the present document.

The present embodiment describes a flow of executing gateway relocation in an X2 handover process of an MRN in a method for an MME judging whether to execute the gateway relocation. FIG. 8 describes the flow of the present embodiment, the process is a flow in a condition of using the architecture shown in FIG. 1, wherein a source S-GW and a source P-GW of the MRN may be built in a source DeNB, or may be not built in the source DeNB but built in an initial DeNB. The method of the present embodiment is also applicable to the mobile relay system architecture shown in FIG. 3, the source S-GW and the source P-GW of the MRN, a target S-GW and a target P-GW of the MRN are all located in a core network. The flow of the present embodiment includes the following steps.

In step 801, the MRN measures that one or more cells meet a condition for triggering a measurement report, and then sends an identifier of a cell meeting the condition and measurement parameters to the source DeNB serving the MRN through the measurement report.

In step 802, after the source DeNB receives the measurement report of the MRN, if it is judged that an X2 interface exists between the source DeNB and the target DeNB, and the MRN is not required to change the MME after the handover, the source DeNB initiates an X2 handover for the MRN. The source DeNB selects one target cell for the MRN according to the measurement report. The source DeNB sends an X2 interface handover request message to the target DeNB.

In step 803, the target DeNB reserves resources for the MRN and establishes context information according to information including QoS of an E-RAB required to be established in the handover request message, and then replies a handover request acknowledgement message. The handover request acknowledgement message contains a transparently transmitted handover command message of an air interface.

In step 804, the source DeNB sends an air interface message RRC connection reconfiguration message to the MRN, the RRC connection reconfiguration message carries the transparently transmitted handover command message which is sent by the target DeNB to the MRN through the source DeNB to indicate the MRN to execute the handover.

In step 805, the source DeNB sends an SN state transfer message to the target DeNB, which is used for transmitting uplink and downlink PDCP SN receiving and sending states of an RLC AM radio bearer.

In step 806, after receiving a handover command, the MRN detaches from a cell of the source DeNB, synchronizes with a target cell, and initiates an RACH process to access the target cell. After completing an RRC connection establishment between the MRN and the target cell, the MRN sends an RRC connection reconfiguration completion message to the target DeNB.

In step 807, after receiving the RRC connection reconfiguration completion message sent by the MRN, the target DeNB sends a path transfer request message to the MME of the MRN to update an S1 user plane and control plane path of the MRN. The mobile relay system architecture shown in FIG. 1 is adopted in the flow of the present embodiment, the path transfer request message also contains addresses of the S-GW and the P-GW built in the target DeNB to assist the MME of the MRN to relocate the gateways of the MRN to the gateways in the target DeNB. If the mobile relay system architecture shown in FIG. 3 is adopted, this message is not required to carry the addresses of the S-GW and the P-GW.

In step 808, the MME judges whether to execute the relocation of the gateways. The MME firstly judges whether it is required to execute the relocation of the gateways according to the current location of the MRN. The MME can obtain the current location of the MRN according to a TAI and/or ECGI of a cell of the DeNB currently serving the MRN.

The mobile relay system architecture shown in FIG. 1 is adopted in the present embodiment, the MME can save a TAI and/or ECGI of a cell of an initial DeNB serving the MRN when the MRN accesses the DeNB in which the gateways of the MRN is located (called as the initial DeNB), to obtain the current locations of the S-GW and the P-GW of the MRN. When a distance between the MRN and the S-GW and P-GW of the MRN is greater than a gateway relocation distance threshold value, the MME judges that it is required to execute the relocation of the gateways; and if the distance is not greater than the gateway relocation distance threshold value, the MME judges that it is not required to execute the relocation of the gateways. If the MME determines that it is required to execute the relocation of the gateways, it is also required to judge whether the target DeNB meets a gateway relocation condition, if the target DeNB meets the gateway relocation condition, the MME determines to execute the relocation of the gateways; and if the target DeNB does not meet the gateway relocation condition, the MME determines not to execute the relocation of the gateways. If the MME determines to execute the relocation of the gateways, the S-GW and the P-GW built in the target DeNB are selected as new gateways serving the MRN (called as a target S-GW and a target P-GW) according to the addresses of the gateways received by the MME.

Wherein the gateway relocation condition includes that: a Tracking Area (TA) supported by the target DeNB contains a TA supported by the MRN. If a means of configuring a dedicated TA for the MRN is adopted, the TA supported by the target DeNB is required to contain the dedicated TA; if a means of configuring a dedicated TA for the MRN is not adopted, the TA supported by the target DeNB is required to contain a TA supported by an initial DeNB (i.e., the DeNB in which the S-GW and the P-GW of the MRN are located).

In a case that the MRN supports network sharing, the gateway relocation condition also includes that: a PLMN supported by the target DeNB is required to contain a PLMN supported by the MRN. This condition can be judged by whether the PLMN supported by the target DeNB contains a PLMN supported by the initial DeNB.

The method of the present embodiment is also applicable to the mobile relay system architecture shown in FIG. 3. Similarly, when a distance between the MRN and the S-GW and P-GW of the MRN is greater than a gateway relocation distance threshold value, the MME judges that it is required to execute the relocation of the gateways; and if the distance is not greater than the gateway relocation distance threshold value, the MME judges that it is not required to execute the relocation of the gateways. If the MME determines that it is required to execute the relocation of the gateways, it is not required to judge whether the gateway relocation condition is met, and it determines to execute the relocation of the gateways serving the MRN; if the MME judges that it is not required to execute relocation of the gateways, it determines not to execute the relocation of the gateways serving the MRN. If the MME determines to execute relocation of the gateways, new gateways (called as the target S-GW and the target P-GW) serving the MRN and located in the core network are reselected.

Steps 809-813 are the same as steps 410-414, which will not be repeated herein.

Embodiment 6

Figure 9:
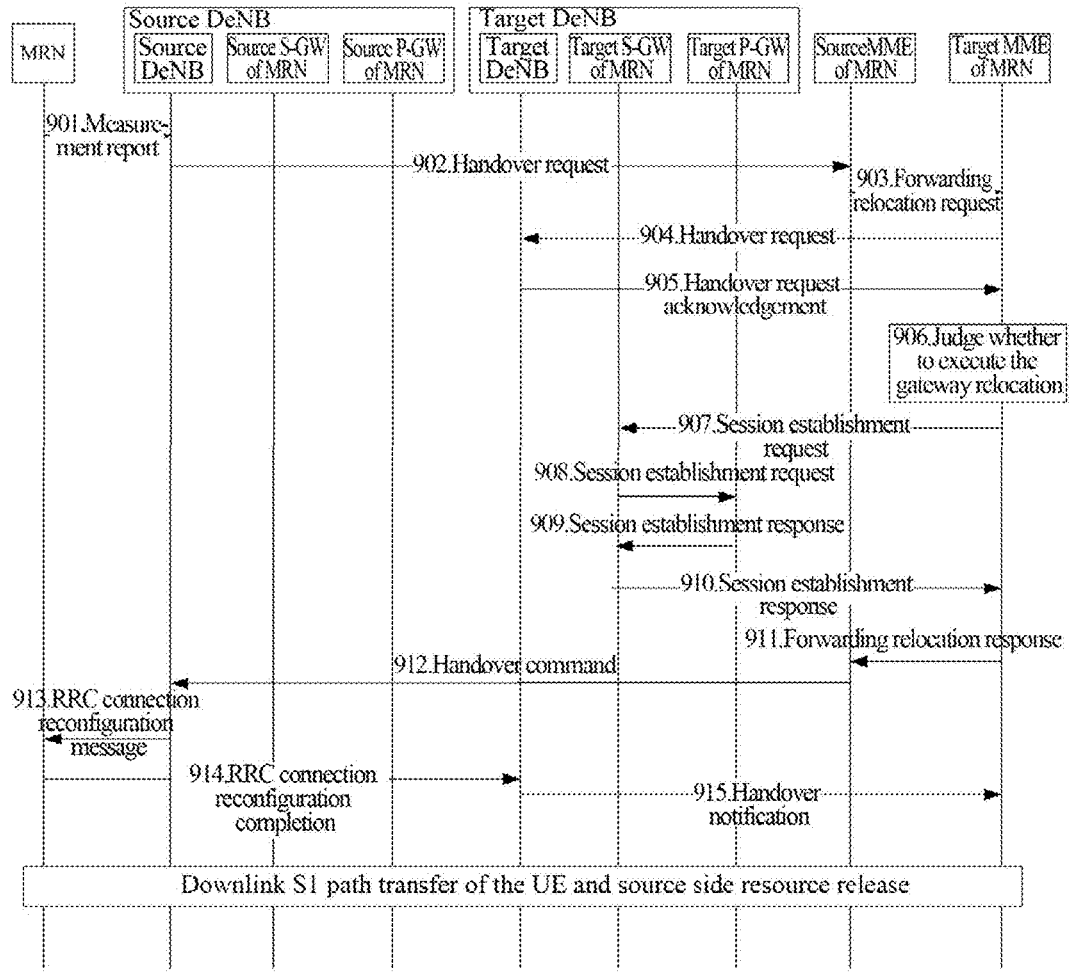
FIG. 9 is a flow chart of a method for gateway relocation according to an embodiment 6 of the present document.

The embodiment describes a flow of executing gateway relocation in an S1 handover process of an MRN in a method for an MME judging whether it is required to execute the gateway relocation. FIG. 9 describes the flow of the present embodiment, the process is a flow in a condition of using the architecture shown in FIG. 1, wherein a source S-GW and a source P-GW of the MRN may be built in a source DeNB, or may be not built in the source DeNB but built in an initial DeNB. The method of the present embodiment is also applicable to the mobile relay system architecture shown in FIG. 3, the source S-GW and the source P-GW of the MRN, a target S-GW and a target P-GW of the MRN are all located in a core network. The flow of the present embodiment includes the following steps.

In step 901, the MRN measures that one or more cells meet a condition for triggering a measurement report, and sends an identifier of a cell meeting the condition and a measurement parameter to the source DeNB serving the MRN through the measurement report.

In step 902, after the source DeNB receives the measurement report of the MRN, if it is judged that an X2 interface does not exist between the source DeNB and the target DeNB, or it is required to reselect one MME for the MRN, it is required to execute an S1 handover for it, and the source DeNB selects one target cell for the MRN according to the measurement report. The source DeNB sends an S1 interface handover request message to a source MME of the MRN.

In step 903, the source MME judges whether it is required to select a new MME according to a base station identifier or a target Tracking Area Identifier (TAI) of the target DeNB in the received handover request message, and if it is required to select a new MME, selects a target MME according to the two parameters, and sends a forwarding relocation request message to the target MME, wherein the forwarding relocation request message carries information of the transparently transmitting container from the source base station to the target base station, a target base station identifier, a target location area identifier, and the context information of the MRN, etc.

In step 904, the target MME of the MRN sends the S1 interface handover request message to the target DeNB.

In step 905, after establishing the context for the MRN and the UE and reserving resources for a bearer of the MRN, the target DeNB sends a handover request acknowledgement message to the target MME of the MRN. In the condition of adopting the system architecture shown in FIG. 1, the handover request acknowledgement message also contains addresses of the S-GW and the P-GW built in the target DeNB to assist the MME of the MRN to relocate the gateways of the MRN to the gateways in the target DeNB. With adopting the system architecture shown in FIG. 3, the handover request acknowledgement message is not required to contain the addresses of the S-GW and the P-GW.

Step 906 is the same as step 808, which will not be repeated herein.

Steps 907-915 are the same as steps 608-616, which will not be repeated herein.

It should be noted that, in a case that the target S-GW and the target P-GW are built in the DeNB, all signalings in step 908 and step 909 are internal interface messages in the target DeNB. Moreover, if it is not required to select a new MME, step 903 and step 911 are skipped, and the behaviors of the source MME and the target MME are the behaviors of the same MME.

It should be noted that steps 906-910 also can be executed after step 915.

In addition, in the condition of adopting the system architecture shown in FIG. 1, the address information of the S-GW and the P-GW built in the target DeNB can be not carried in step 905, the address information of the S-GW and the P-GW can be carried in the handover notification message in step 915, and correspondingly, steps 906-910 are executed after step 915.

The method of the present embodiment is also applicable to the system architecture shown in FIG. 3, steps 906-910 also can be executed after step 903 and before step 904. In this system architecture, the target MME selects new S-GW and P-GW located in the core network for the MRN.

Figure 10:
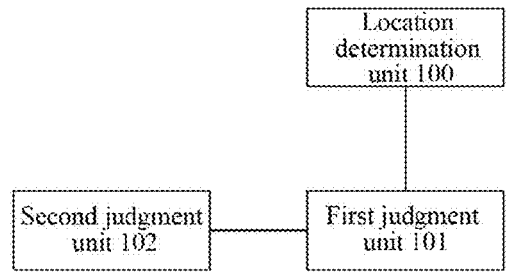
FIG. 10 is an architecture diagram of a mobility management entity according to an embodiment of the present document.

As shown in FIG. 10, an embodiment also provides a mobility management entity, which includes: a location determination unit 100 and a first judgment unit 101, wherein:

the location determination unit 100 is used to: in a process of an MRN performing handover of a DeNB, determine a current location of the MRN; and the first judgment unit 101 is used to: judge whether it is required to execute a relocation of a gateway serving the MRN according to the current location of the MRN.

The first judgment unit 101 is used to judge whether it is required to execute the relocation of the gateway serving the MRN according to the current location of the MRN in the following way:

judging whether it is required to execute the relocation of the gateway serving the MRN according to a distance between the MRN and the gateway serving the MRN, and judging that it is required to execute the relocation of the gateway serving the MRN when the distance between the MRN and the gateway serving the MRN is greater than a gateway relocation distance threshold value.

The location determination unit 100 is used to determine the current location of the MRN in the following way: obtaining the current location of the MRN according to a tracking area code and/or a cell identifier of a cell in a DeNB in which the MRN is located currently;

the location determination unit 100 is further used to: obtain a location of the gateway serving the MRN according to the saved location related information of the gateway serving the MRN; and the first judgment unit 101 is used to judge whether it is required to execute the relocation of the gateway serving the MRN according to the distance between the MRN and the gateway serving the MRN in the following way: according to the current location of the MRN and the location of the gateway serving the MRN, determining the distance between the MRN and the gateway serving the MRN, and judging whether it is required to execute the relocation of the gateway serving the MRN.

The mobility management entity also includes: a second judgment unit 102, wherein:

the second judgment unit 102 is used to: after the first judgment unit judges that it is required to execute the relocation of the gateway serving the MRN, in a system architecture that the gateway serving the MRN is built in a DeNB, judge whether a target DeNB of the MRN meets a gateway relocation condition, if the target DeNB of the MRN meets the gateway relocation condition, determine to execute the relocation of the gateway serving the MRN; and if the target DeNB of the MRN does not meet the gateway relocation condition, determine not to execute the relocation of the gateway serving the MRN.

The second judgment unit 102 is used to judge whether the target DeNB of the MRN meets the gateway relocation condition in the following way:

judging whether a tracking area supported by the target DeNB contains a tracking area supported by the MRN; or, judging whether a tracking area supported by the target DeNB contains a tracking area supported by a DeNB in which a gateway currently serving the MRN is located.

The second judgment unit 102 is used to judge whether the target DeNB of the MRN meets the gateway relocation condition in the following way:

judging whether a PLMN in which the target DeNB is located contains a PLMN in which the MRN is located; or, judging whether a PLMN in which the target DeNB is located contains a PLMN in which the DeNB in which the gateway currently serving the MRN is located is located.

Figure 11:
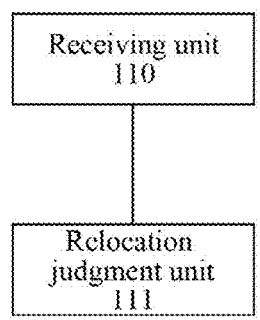
FIG. 11 is an architecture diagram of another mobility management entity according to an embodiment of the present document.

As shown in FIG. 11, another mobility management entity provided in an embodiment includes: a receiving unit 110 and a relocation judgment unit 111, wherein:

the receiving unit 110 is used to: in a process of an MRN performing handover of a DeNB, receive relocation judgment indication information; and the relocation judgment unit 111 is used to: judge whether it is required to execute a relocation of a gateway serving the MRN according to the relocation judgment indication information;

wherein, the relocation judgment indication information is sent to the receiving unit 110 after a source DeNB or a target DeNB of the MRN judges whether it is required to execute the relocation of the gateway serving the MRN according to relocation judgment auxiliary information; or the relocation judgment indication information is sent to the receiving unit 110 after a target DeNB of the MRN judges whether it is required to execute the relocation of the gateway serving the MRN according to configuration information.

The relocation judgment unit 111 is used to judge whether it is required to execute the relocation of the gateway serving the MRN according to the relocation judgment indication information in the following way:

in a case that the relocation judgment indication information is explicit indication information, judging that it is required to execute the relocation of the gateway serving the MRN when the relocation judgment indication information indicates that it is required to execute the relocation; and judging that it is not required to execute the relocation of the gateway serving the MRN when the relocation judgment indication information is not received or the relocation judgment indication information indicates that it is not required to execute the relocation; or, in a case that the relocation judgment indication information is implicit indication information and the relocation judgment indication information is implicitly indicated using an address of the gateway serving the MRN, judging that it is required to execute the relocation of the gateway serving the MRN when the address is received; and judging that it is not required to execute the relocation of the gateway serving the MRN when the address is not received.

Figure 12:
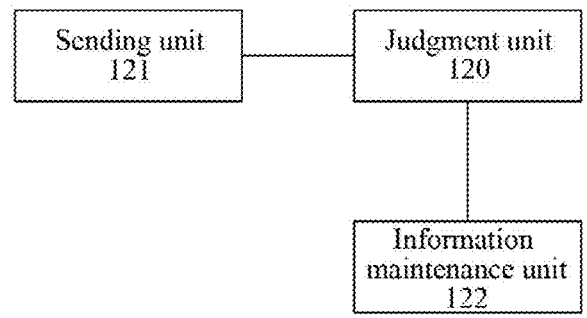
FIG. 12 is an architecture diagram of a donor evolved Node B according to an embodiment of the present document.

As shown in FIG. 12, an embodiment also provides a donor evolved Node B, which includes: a judgment unit 120 and a sending unit 121, wherein:

the judgment unit 120 is used to: in a process of an MRN performing handover of a DeNB, judge whether it is required to execute a relocation of a gateway serving the MRN according to relocation judgment auxiliary information; or, judge whether it is required to execute a relocation of a gateway serving the MRN according to configuration information; and the sending unit 121 is used to: send relocation judgment indication information to an MME of the MRN.

The relocation judgment auxiliary information includes: the relocation judgment auxiliary information comprises: counting information used for counting times of handover occurrence in the MRN after the last gateway relocation occurs; or, indication information in a history accessing cell list of the MRN and used for marking a source cell or a target cell when the gateway relocation occurs in the MRN; or, identification information of a source cell or a target cell when the gateway relocation occurs in the MRN; or, history accessing cell record information of the MRN after the last gateway relocation occurs.

The judgment unit 120 is used to judge whether it is required to execute the relocation of the gateway serving the MRN according to the relocation judgment auxiliary information in the following way:

determining, according to the relocation judgment auxiliary information, the number of cells which the MRN accesses after the last relocation of the gateway serving the MRN; and judging whether the number of cells which the MRN accesses after the last relocation of the gateway serving the MRN reaches an accessing cell number threshold value, and if the number of cells which the MRN accesses after the last relocation of the gateway serving the MRN reaches the accessing cell number threshold value, judging that it is required to execute the relocation of the gateway serving the MRN.

The sending unit 121 is used to send the relocation judgment indication information to the MME of the MRN in the following way:

in a system architecture that the gateway serving the MRN is built in the DeNB, if the judgment unit judges that it is required to execute the relocation of the gateway serving the MRN, taking address information of the gateway serving the MRN as the relocation judgment indication information to send to the MME. After receiving the address information of the gateway serving the MRN, the MME determines that it is required to execute the relocation of the gateway serving the MRN.

The donor evolved Node B also includes: an information maintenance unit 122, wherein:

the information maintenance unit 122 is used to: when the relocation judgment auxiliary information contains the counting information, clear the counting information after executing the relocation of the gateway serving the MRN in the current handover process, wherein, the counting information is obtained by the source DeNB or the target DeNB of the MRN adding 1 to the counting information every time the handover process of the MRN occurs without executing the relocation of the gateway serving the MRN;

when the relocation judgment auxiliary information contains the indication information, add the indication information into an item of the source cell or the target cell corresponding to the current handover in the history accessing cell list of the MRN;

when the relocation judgment auxiliary information contains the identification information, set identification information of the source cell or the target cell corresponding to the current handover as the relocation judgment auxiliary information; and when the relocation judgment auxiliary information contains the history accessing cell record information of the MRN after the last gateway relocation occurs, clear the history accessing cell record information.

The ordinary person skilled in the art can understand that all or part of the steps in the above method can be completed by a program instructing related hardware, and the program can be stored in a computer readable memory medium, such as a read-only memory, a disk or an optical disk, and so on. Alternatively, all or part of the steps of the above embodiments also can be implemented by using one or more integrated circuits. Correspondingly, each module/unit in the above embodiments can be implemented in a form of hardware, and also can be implemented in a form of software function module. The embodiment of the present document is not limited to any combination of hardware and software in a specific form.

The above description is only the preferred embodiments of the present document, which is not used to limit the present document. All the modifications, equivalent substitutions, and improvements, etc. made within the spirit and principle of the embodiments of the present document shall fall into the protection scope of the appended claims of the present document.

INDUSTRIAL APPLICABILITY

In the embodiments of the present document, the problem of judging whether to execute the gateway relocation in the handover process of the MRN can be solved, so that routing optimization is smoothly executed, thereby shortening the delay of UE data and signaling.

What is claimed is:

1. A method for gateway relocation, comprising:
in a process of a mobile relay node, MRN, performing handover of a donor evolved Node B, DeNB, a mobility management entity, MME, of the MRN receiving relocation judgment indication information, and judging whether it is required to execute a relocation of a gateway serving the MRN according to the relocation judgment indication information;
wherein, the relocation judgment indication information is sent to the MME after a source DeNB or a target DeNB of the MRN judges whether it is required to execute the relocation of the gateway serving the MRN according to relocation judgment auxiliary information; or the relocation judgment indication information is sent to the MME after a target DeNB of the MRN judges whether it is required to execute the relocation of the gateway serving the MRN according to configuration information;
wherein:
the relocation judgment auxiliary information comprises:
counting information used for counting times of handover occurrence in the MRN after the last gateway relocation occurs; or,
indication information in a history accessing cell list of the MRN and used for marking a source cell or a target cell when multiple times of history gateway relocation occurs in the MRN; or,
identification information of a source cell or a target cell when multiple times of history gateway relocation occurs in the MRN; or,
history accessing cell record information of the MRN after the last gateway relocation occurs;
wherein, the source DeNB or the target DeNB of the MRN judging whether it is required to execute the relocation of the gateway serving the MRN according to the relocation judgment auxiliary information comprises:
the source DeNB or the target DeNB, according to the relocation judgment auxiliary information, determining the number of cells which the MRN accesses after the last relocation of the gateway serving the MRN; and
the source DeNB or the target DeNB judging whether the number of cells which the MRN accesses after the last relocation of the gateway serving the MRN reaches an accessing cell number threshold value, and if the number of cells which the MRN accesses after the last relocation of the gateway serving the MRN reaches the accessing cell number threshold value, judging that it is required to execute the relocation of the gateway serving the MRN.

2. The method according to claim 1, further comprising:
in a system architecture that the gateway serving the MRN is built in the DeNB, if the source DeNB or the target DeNB judges that it is required to execute the relocation of the gateway serving the MRN, the target DeNB taking address information of the gateway serving the MRN built in the target DeNB as the relocation judgment indication information to send to the MME; and the MME determining that it is required to execute the relocation of the gateway serving the MRN after receiving the address information of the gateway serving the MRN.

3. The method according to claim 1, further comprising:
the MME determining to execute the relocation of the gateway serving the MRN after judging that it is required to execute the relocation of the gateway serving the MRN.

4. The method according to claim 1, further comprising:
after the MME judges that it is required to execute the relocation of the gateway serving the MRN, when the gateway serving the MRN is built in the target DeNB of the MRN, the MME judging whether the target DeNB of the MRN meets a gateway relocation condition, if the target DeNB of the MRN meets the gateway relocation condition, the MME determining to execute the relocation of the gateway serving the MRN; and if the target DeNB of the MRN does not meet the gateway relocation condition, the MME determining not to execute the relocation of the gateway serving the MRN; and
in an architecture that the gateway serving the MRN is located in a core network, the MME determining to execute the relocation of the gateway serving the MRN after judging that it is required to execute the relocation of the gateway serving the MRN.

5. The method according to claim 3, further comprising:
the MME executing relocation of the gateway serving the MRN after determining to execute the relocation of the gateway serving the MRN, wherein, the relocation at least comprises a relocation of a packet data network gateway, P-GW, or a service gateway, S-GW, serving the MRN; and transferring a packet data network, PDN, connection of the MRN to the relocated gateway.

6. The method according to claim 1, wherein:
the relocation judgment auxiliary information is saved and maintained by a DeNB which saves context information of the MRN; when the handover occurs in the MRN, the relocation judgment auxiliary information is sent by the source DeNB to the target DeNB.

7. The method according to claim 1, further comprising:
when the relocation judgment auxiliary information contains the counting information, the source DeNB or the target DeNB clearing the counting information after executing the relocation of the gateway serving the MRN in the current handover process, wherein, the counting information is obtained by the source DeNB or the target DeNB of the MRN adding 1 to the counting information every time the handover process of the MRN occurs without executing the relocation of the gateway serving the MRN;
when the relocation judgment auxiliary information contains the indication information, the source DeNB or the target DeNB adding the indication information into an item of the source cell or the target cell corresponding to the current handover in the history accessing cell list of the MRN;

when the relocation judgment auxiliary information contains the identification information, the source DeNB or the target DeNB setting identification information of the source cell or the target cell corresponding to the current handover as the relocation judgment auxiliary information; and
when the relocation judgment auxiliary information contains the history accessing cell record information of the MRN after the last gateway relocation occurs, the source DeNB or the target DeNB clearing the history accessing cell record information.

8. The method according to claim 2, wherein, the MME judging whether it is required to execute the relocation of the gateway serving the MRN according to the relocation judgment indication information comprises:
in a case that the relocation judgment indication information is explicit indication information, the MME judging that it is required to execute the relocation of the gateway serving the MRN when the relocation judgment indication information indicates that it is required to execute the relocation; and the MME judging that it is not required to execute the relocation of the gateway serving the MRN when the MME does not receive the relocation judgment indication information or the relocation judgment indication information indicates that it is not required to execute the relocation; or,
in a case that the relocation judgment indication information is implicit indication information and the relocation judgment indication information is implicitly indicated using an address of the gateway serving the MRN, the MME judging that it is required to execute the relocation of the gateway serving the MRN when the MME receives the address; and the MME judging that it is not required to execute the relocation of the gateway serving the MRN when the MME does not receive the address.

9. A mobility management entity, comprising: a receiver and a relocation judgment circuit, wherein:
the receiver is configured to: in a process of a mobile relay node, MRN, performing handover of a donor evolved Node B, DeNB, receive relocation judgment indication information; and
the relocation judgment circuit is configured to: judge whether it is required to execute a relocation of a gateway serving the MRN according to the relocation judgment indication information;
wherein, the relocation judgment indication information is sent to the receiver after a source DeNB or a target DeNB of the MRN judges whether it is required to execute the relocation of the gateway serving the MRN according to relocation judgment auxiliary information; or the relocation judgment indication information is sent to the receiver after a target DeNB of the MRN judges whether it is required to execute the relocation of the gateway serving the MRN according to configuration information;
wherein:
the relocation judgment auxiliary information comprises:
counting information used for counting times of handover occurrence in the MRN after the last gateway relocation occurs; or,
indication information in a history accessing cell list of the MRN and used for marking a source cell or a target cell when multiple times of history gateway relocation occurs in the MRN, or, identification information of a source cell or a target cell when multiple times of history gateway relocation occurs in the MRN; or,
history accessing cell record information of the MRN after the last gateway relocation occurs;
wherein, the source DeNB or the target DeNB of the MRN judging whether it is required to execute the relocation of the gateway serving the MRN according to the relocation judgment auxiliary information comprises:
the source DeNB or the target DeNB, according to the relocation judgment auxiliary information, determining the number of cells which the MRN accesses after the last relocation of the gateway serving the MRN; and
the source DeNB or the target DeNB judging whether the number of cells which the MRN accesses after the last relocation of the gateway serving the MRN reaches an accessing cell number threshold value, and if the number of cells which the MRN accesses after the last relocation of the gateway serving the MRN reaches the accessing cell number threshold value, judging that it is required to execute the relocation of the gateway serving the MRN.

10. The mobility management entity according to claim 9, wherein:
the relocation judgment circuit is configured to judge whether it is required to execute the relocation of the gateway serving the MRN according to the relocation judgment indication information in the following way:
in a case that the relocation judgment indication information is explicit indication information, judging that it is required to execute the relocation of the gateway serving the MRN when the relocation judgment indication information indicates that it is required to execute the relocation; and judging that it is not required to execute the relocation of the gateway serving the MRN when the relocation judgment indication information is not received or the relocation judgment indication information indicates that it is not required to execute the relocation; or,
in a case that the relocation judgment indication information is implicit indication information and the relocation judgment indication information is implicitly indicated using an address of the gateway serving the MRN, judging that it is required to execute the relocation of the gateway serving the MRN when the address is received; and judging that it is not required to execute the relocation of the gateway serving the MRN when the address is not received.

11. A donor evolved Node B, comprising: a judgment circuit and a transmitter, wherein:
the judgment circuit is configured to: in a process of a mobile relay node, MRN, performing handover of a donor evolved Node B, DeNB, judge whether it is required to execute a relocation of a gateway serving the MRN according to relocation judgment auxiliary information; or, judge whether it is required to execute a relocation of a gateway serving the MRN according to configuration information; and
the transmitter is configured to: send relocation judgment indication information to a mobility management entity, MME, of the MRN; wherein:
the relocation judgment auxiliary information comprises:
counting information used for counting times of handover occurrence in the MRN after the last gateway relocation occurs; or,
indication information in a history accessing cell list of the MRN and used for marking a source cell or a target cell when multiple times of history gateway relocation occurs in the MRN; or,
identification information of a source cell or a target cell when multiple times of history gateway relocation occurs in the MRN; or,
history accessing cell record information of the MRN after the last gateway relocation occurs; wherein:
the judgment circuit is configured to judge whether it is required to execute the relocation of the gateway serving the MRN according to the relocation judgment auxiliary information in the following way:
determining, according to the relocation judgment auxiliary information, the number of cells which the MRN accesses after the last relocation of the gateway serving the MRN; and judging whether the number of cells which the MRN accesses after the last relocation of the gateway serving the MRN reaches an accessing cell number threshold value, and if the number of cells which the MRN accesses after the last relocation of the gateway serving the MRN reaches the accessing cell number threshold value, judging that it is required to execute the relocation of the gateway serving the MRN.

12. The donor evolved Node B according to claim 11, wherein:
the transmitter is configured to send the relocation judgment indication information to the MME of the MRN in the following way:
in a system architecture that the gateway serving the MRN is built in the DeNB, if the judgment unit judges that it is required to execute the relocation of the gateway serving the MRN, taking address information of the gateway serving the MRN as the relocation judgment indication information to send to the MME.

13. The donor evolved Node B according to claim 11, further comprising: an information maintenance circuit, wherein:
the information maintenance circuit is configured to:
when the relocation judgment auxiliary information contains the counting information, clear the counting information after executing the relocation of the gateway serving the MRN in the current handover process, wherein, the counting information is obtained by the source DeNB or the target DeNB of the MRN adding 1 to the counting information every time the handover process of the MRN occurs without executing the relocation of the gateway serving the MRN;
when the relocation judgment auxiliary information contains the indication information, add the indication information into an item of the source cell or the target cell corresponding to the current handover in the history accessing cell list of the MRN;
when the relocation judgment auxiliary information contains the identification information, set identification information of the source cell or the target cell corresponding to the current handover as the relocation judgment auxiliary information; and
when the relocation judgment auxiliary information contains the history accessing cell record information of the MRN after the last gateway relocation occurs, clear the history accessing cell record information.

* * * * *